United States Patent
Chan et al.

(10) Patent No.: US 10,282,660 B2
(45) Date of Patent: May 7, 2019

(54) SIMULTANEOUS LATENCY AND RATE CODING FOR AUTOMATIC ERROR CORRECTION

(71) Applicant: QUALCOMM Incorporated, San Diego, CA (US)

(72) Inventors: Victor Hokkiu Chan, Del Mar, CA (US); Ryan Michael Carey, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1005 days.

(21) Appl. No.: 14/279,375

(22) Filed: May 16, 2014

(65) Prior Publication Data
US 2015/0193680 A1 Jul. 9, 2015

Related U.S. Application Data

(60) Provisional application No. 61/924,074, filed on Jan. 6, 2014.

(51) Int. Cl.
*G06N 7/02* (2006.01)
*G06N 7/04* (2006.01)
(Continued)

(52) U.S. Cl.
CPC .............. *G06N 3/08* (2013.01); *G06N 3/049* (2013.01)

(58) Field of Classification Search
None
See application file for complete search history.

(56) References Cited

U.S. PATENT DOCUMENTS 5,107,442 A * 4/1992 Weideman ........... G06N 3/0454
  382/157
6,581,046 B1 * 6/2003 Ahissar .................. G06N 3/049
  706/15
(Continued)

FOREIGN PATENT DOCUMENTS

JP 2005267105 A 9/2005
TW 1249133 B 2/2006

OTHER PUBLICATIONS

Perceptual Inference Predicts Contextual Modulations of Sensory Responses 2012 Timm Lochmann,1,2 Udo A. Ernst,3 and Sophie Dene'vel.*

(Continued)

*Primary Examiner* — Scott A. Waldron
*Assistant Examiner* — Ababacar Seck
(74) *Attorney, Agent, or Firm* — Patterson & Sheridan, LLP

(57) ABSTRACT

Methods and apparatus are provided for identifying environmental stimuli in an artificial nervous system using both spiking onset and spike counting. One example method of operating an artificial nervous system generally includes receiving a stimulus; generating, at an artificial neuron, a spike train of two or more spikes based at least in part on the stimulus; identifying the stimulus based at least in part on an onset of the spike train; and checking the identified stimulus based at least in part on a rate of the spikes in the spike train. In this manner, certain aspects of the present disclosure may respond with short response latencies and may also maintain accuracy by allowing for error correction.

24 Claims, 29 Drawing Sheets

(51) Int. Cl.
  *G06N 7/06*   (2006.01)
  *G06N 7/08*   (2006.01)
  *G06N 3/08*   (2006.01)
  *G06N 3/04*   (2006.01)

(56) References Cited

U.S. PATENT DOCUMENTS

| | | | | |
|---|---|---|---|---|
| 7,395,251 | B2 | 7/2008 | Linsker | |
| 7,430,546 | B1* | 9/2008 | Suri | G06N 3/08 706/14 |
| 8,504,502 | B2 | 8/2013 | Fiorillo | |
| 9,047,568 | B1* | 6/2015 | Fisher | G06N 3/0472 |
| 9,189,730 | B1* | 11/2015 | Coenen | G06N 3/049 |
| 2004/0204769 | A1* | 10/2004 | Richmond | A61B 5/04888 623/25 |
| 2010/0191695 | A1* | 7/2010 | Danish | A61B 5/0476 706/52 |
| 2013/0151448 | A1* | 6/2013 | Ponulak | G06N 3/049 706/25 |
| 2013/0151450 | A1* | 6/2013 | Ponulak | G06N 3/049 706/25 |
| 2013/0203027 | A1* | 8/2013 | De Villers-Sidani | G09B 19/003 434/236 |
| 2013/0261490 | A1* | 10/2013 | Truccolo | A61B 5/0482 600/544 |
| 2013/0322215 | A1* | 12/2013 | Du | G10L 25/78 367/136 |
| 2014/0032459 | A1 | 1/2014 | Sinyavskiy et al. | |
| 2014/0081895 | A1 | 3/2014 | Coenen et al. | |
| 2014/0122398 | A1* | 5/2014 | Richert | G06N 3/02 706/15 |
| 2014/0229411 | A1* | 8/2014 | Richert | G06N 3/08 706/16 |

OTHER PUBLICATIONS

Stochastically Gating Ion Channels Enable Patterned Spike Firing through Activity-Dependent Modulation of Spike Probability 2009 Joshua T. Dudman1*, Matthew F. Nolan2.*

Manipulations of spike trains and their impact on synchrony analysis—2007 von Antonio Pazienti.*

Perceptual Inference Predicts Contextual Modulations of Sensory Responses—2012 Lochmann et al.*

Stochastically Gating Ion Channels Enable Patterned Spike Firing through Activity-Dependent Modulation of Spike Probability—2009 Dudman et al.*

A cross-interval spike train analysis: the correlation between spike generation and temporal integration of doublets—1998 David C. Tam.*

Spike Train Analysis CNS Tutorial Berlin, Jul. 18, 2009 Jutta Kretzberg (Year: 2009).*

Fast Coding of Orientation in Primary Visual Cortex Shriki et al. (Year: 2012).*

Endres D., et al., "Modelling Spike Trains and Extracting Response Latency with Bayesian binning", Journal of Physiology—Paris, vol. 104, No. 3-4, Nov. 27, 2009 (Nov. 27, 2009), pp. 128-136, XP027032982, BDOI: 10.1016/j.jphysparis.2009.11.015 figure 5, sections 2 and 4.

International Search Report and Written Opinion—PCT/US2014/071372—ISA/EPO—Aug. 27, 2015.

Lee J., et al., "Trial-to-Trial Variability of Spike Response of V1 and Saccadic", Journal of Neurophysiology, vol. 104, No. 5, Sep. 1, 2010 (Sep. 1, 2010), pp. 2556-2572, XP055207925, DOI: 10.1152/jn.01040.2009 figure 2 and "Determination of NL".

Shinomoto S., et al., "A Solution to the controversy Between Rate and Temporal Coding", Statistics in Medicine, vol. 26, No. 21, May 24, 2007 (May 24, 2007), pp. 4032-4038, XP055207931, DOI: 10.1002/sim.2932 the whole document.

Tsubo Y., et al., "Passage-Time Coding with a Timing Kernel Inferred from Irregular Cortical Spike Sequences", Journal of Statistical Mechanics: Theory and Experiment, vol. 2013, P03004, Mar. 12, 2013 (Mar. 12, 2013), 21 Pages, XP020241995, DOI: 10.1088/1742-5468/2013/03/P03004 abstract, sections 2 and 4.

Taiwan Search Report—TW103145024—TIPO—Oct. 12, 2018.

Watanabe M., et al., "Dual Coding and Network Dynamics", IEICE Technical Report, Institute of Electronics, Information and Communication Engineers, Jul. 11, 2000, vol. 100, No. 191, pp. 31-36.

* cited by examiner input pattern:

stimulus L detector:

ISI

SIMULTANEOUS LATENCY AND RATE CODING FOR AUTOMATIC ERROR CORRECTION

CLAIM OF PRIORITY UNDER 35 U.S.C. § 119

This application claims benefit of U.S. Provisional Patent Application Ser. No. 61/924,074, filed Jan. 6, 2014 and entitled "Simultaneous Latency and Rate Coding for Automatic Error Correction," which is herein incorporated by reference in its entirety.

BACKGROUND

Field

Certain aspects of the present disclosure generally relate to artificial nervous systems and, more particularly, to discriminating between environmental stimuli in an artificial nervous system using both spiking onset and spike counting.

Background

An artificial neural network, which may comprise an interconnected group of artificial neurons (i.e., neuron models), is a computational device or represents a method to be performed by a computational device. Artificial neural networks may have corresponding structure and/or function in biological neural networks. However, artificial neural networks may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome.

One type of artificial neural network is the spiking neural network, which incorporates the concept of time into its operating model, as well as neuronal and synaptic state, thereby providing a rich set of behaviors from which computational function can emerge in the neural network. Spiking neural networks are based on the concept that neurons fire or "spike" at a particular time or times based on the state of the neuron, and that the time is important to neuron function. When a neuron fires, it generates a spike that travels to other neurons, which, in turn, may adjust their states based on the time this spike is received. In other words, information may be encoded in the relative or absolute timing of spikes in the neural network.

SUMMARY

Certain aspects of the present disclosure generally relate to using both latency and rate coding (e.g., spiking onset and spike count within a time window, respectively) to identify and differentiate between environmental stimuli received by an artificial nervous system.

Certain aspects of the present disclosure provide a method for operating an artificial nervous system. The method generally includes receiving a stimulus; generating, at a first device (e.g., an artificial neuron), a spike train of two or more spikes based at least in part on the stimulus; identifying the stimulus based at least in part on an onset of the spike train; and checking the identified stimulus based at least in part on a rate of the spikes in the spike train.

Certain aspects of the present disclosure provide an apparatus for operating an artificial nervous system. The apparatus typically includes a processing system and a memory coupled to the processing system. The processing system is generally configured to receive a stimulus, to generate a spike train of two or more spikes based at least in part on the stimulus, to identify the stimulus based at least in part on an onset of the spike train, and to check the identified stimulus based at least in part on a rate of the spikes in the spike train.

Certain aspects of the present disclosure provide an apparatus for operating an artificial nervous system. The apparatus generally includes means for receiving a stimulus, means for generating a spike train of two or more spikes based at least in part on the stimulus, means for identifying the stimulus based at least in part on an onset of the spike train, and means for checking the identified stimulus based at least in part on a rate of the spikes in the spike train.

Certain aspects of the present disclosure provide a computer program product for operating an artificial nervous system. The computer program product generally includes a computer-readable medium having instructions executable to receive a stimulus, to generate a spike train of two or more spikes based at least in part on the stimulus, to identify the stimulus based at least in part on an onset of the spike train, and to check the identified stimulus based at least in part on a rate of the spikes in the spike train.

Certain aspects of the present disclosure provide a method for identifying a stimulus in an artificial nervous system. The method generally includes receiving a spike train of two or more spikes at an artificial neuron, outputting a first spike from the artificial neuron based at least in part on the onset of the spike train, and outputting a second spike from the artificial neuron based at least in part on a rate of the spikes in the spike train.

Certain aspects of the present disclosure provide an apparatus for identifying a stimulus in an artificial nervous system. The apparatus typically includes a processing system and a memory coupled to the processing system. The processing system is generally configured to receive a spike train of two or more spikes at an artificial neuron, to output a first spike from the artificial neuron based at least in part on the onset of the spike train, and to output a second spike from the artificial neuron based at least in part on a rate of the spikes in the spike train.

Certain aspects of the present disclosure provide an apparatus for identifying a stimulus in an artificial nervous system. The apparatus generally includes means for receiving a spike train of two or more spikes at an artificial neuron, means for outputting a first spike from the artificial neuron based at least in part on the onset of the spike train, and means for outputting a second spike from the artificial neuron based at least in part on a rate of the spikes in the spike train.

Certain aspects of the present disclosure provide a computer program product for identifying a stimulus in an artificial nervous system. The computer program product generally includes a computer-readable medium (e.g., a computer-readable storage device) having instructions executable to receive a spike train of two or more spikes at an artificial neuron, to output a first spike from the artificial neuron based at least in part on the onset of the spike train, and to output a second spike from the artificial neuron based at least in part on a rate of the spikes in the spike train.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
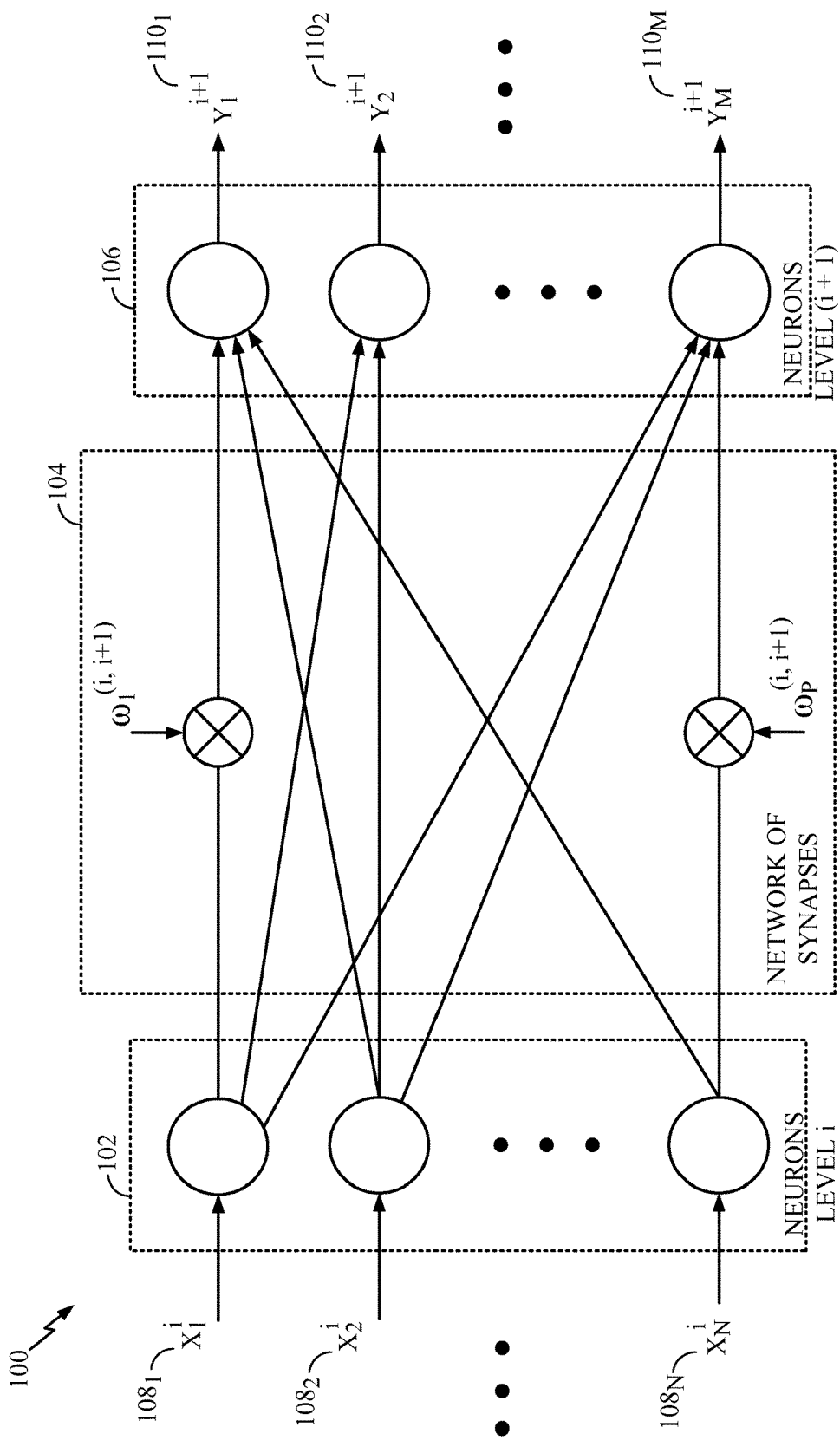
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104 (i.e., feed-forward connections). For simplicity, only two levels of neurons are illustrated in FIG. 1, although fewer or more levels of neurons may exist in a typical neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by a plurality of neurons of a previous level (not shown in FIG. 1). The signal 108 may represent an input (e.g., an input current) to the level 102 neuron. Such inputs may be accumulated on the neuron membrane to charge a membrane potential. When the membrane potential reaches its threshold value, the neuron may fire and generate an output spike to be transferred to the next level of neurons (e.g., the level 106). Such behavior can be emulated or simulated in hardware and/or software, including analog and digital implementations.

In biological neurons, the output spike generated when a neuron fires is referred to as an action potential. This electrical signal is a relatively rapid, transient, all-or nothing nerve impulse, having an amplitude of roughly 100 mV and a duration of about 1 ms. In a particular aspect of a neural system having a series of connected neurons (e.g., the transfer of spikes from one level of neurons to another in FIG. 1), every action potential has basically the same amplitude and duration, and thus, the information in the signal is represented only by the frequency and number of spikes (or the time of spikes), not by the amplitude. The information carried by an action potential is determined by the spike, the neuron that spiked, and the time of the spike relative to one or more other spikes.

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104). For certain aspects, these signals may be scaled according to adjustable synaptic weights $w_1^{(i,i+1)}, \ldots, w_P^{(i,i+1)}$ (where P is a total number of synaptic connections between the neurons of levels 102 and 106). For other aspects, the synapses 104 may not apply any synaptic weights. Further, the (scaled) signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

Biological synapses may be classified as either electrical or chemical. While electrical synapses are used primarily to send excitatory signals, chemical synapses can mediate either excitatory or inhibitory (hyperpolarizing) actions in postsynaptic neurons and can also serve to amplify neuronal signals. Excitatory signals typically depolarize the membrane potential (i.e., increase the membrane potential with respect to the resting potential). If enough excitatory signals are received within a certain period to depolarize the membrane potential above a threshold, an action potential occurs in the postsynaptic neuron. In contrast, inhibitory signals generally hyperpolarize (i.e., lower) the membrane potential. Inhibitory signals, if strong enough, can counteract the sum of excitatory signals and prevent the membrane potential from reaching threshold. In addition to counteracting synaptic excitation, synaptic inhibition can exert powerful control over spontaneously active neurons. A spontaneously active neuron refers to a neuron that spikes without further input, for example, due to its dynamics or feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and the like. Each neuron (or neuron model) in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, wherein a particular functionality may be based on synaptic weights stored in a memory card currently attached to the neural processor.

Figure 2:
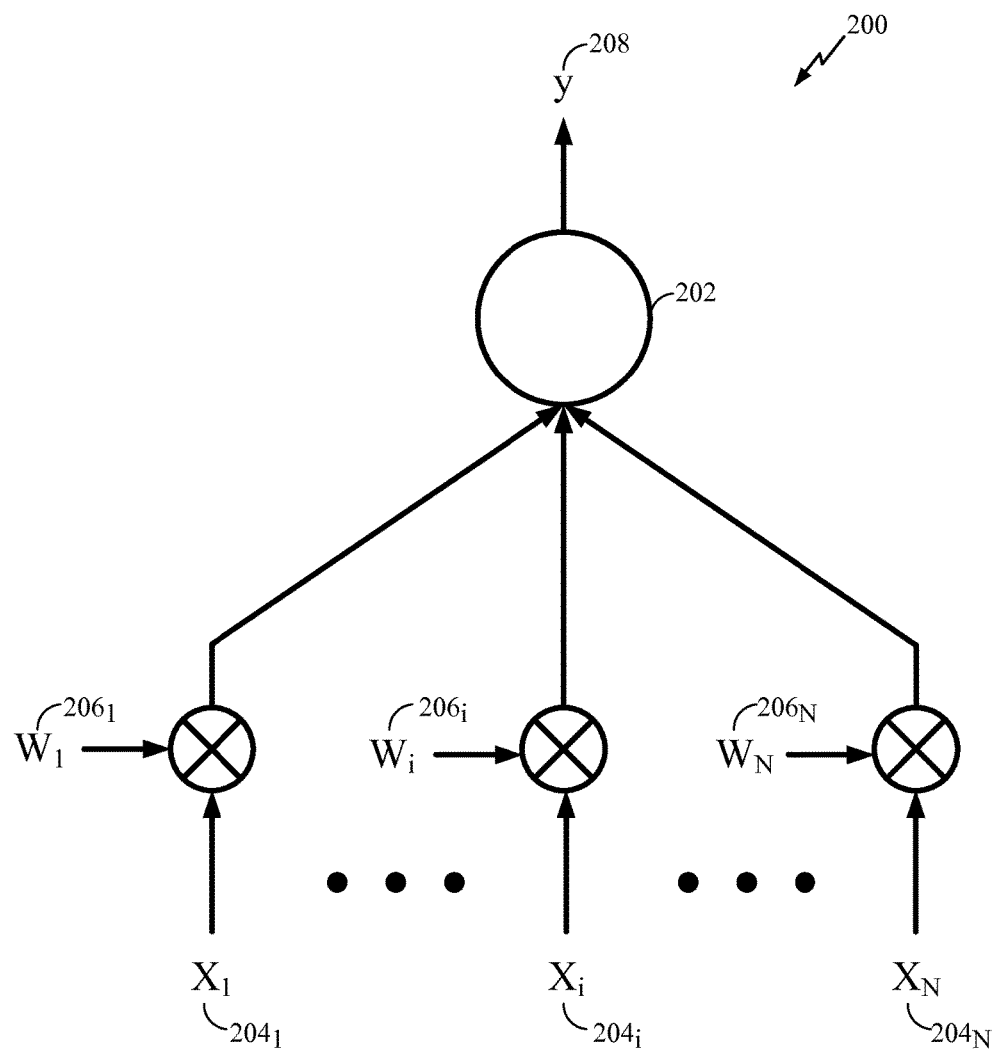
FIG. 2 illustrates an example processing unit (neuron) of a computational network (neural system or neural network), in accordance with certain aspects of the present disclosure.

FIG. 2 illustrates an example 200 of a processing unit (e.g., an artificial neuron 202) of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$ ($x_1$-$x_N$), which may be signals external to the neural system, or signals generated by other neurons of the same neural system, or both. The input signal may be a current or a voltage, real-valued or complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($w_1$-$w_N$), where N may be a total number of input connections of the neuron 202.

The neuron 202 may combine the scaled input signals and use the combined scaled inputs to generate an output signal 208 (i.e., a signal y). The output signal 208 may be a current, or a voltage, real-valued or complex-valued. The output signal may comprise a numerical value with a fixed-point or a floating-point representation. The output signal 208 may be then transferred as an input signal to other neurons of the same neural system, or as an input signal to the same neuron 202, or as an output of the neural system.

The processing unit (neuron 202) may be emulated by an electrical circuit, and its input and output connections may be emulated by wires with synaptic circuits. The processing unit, its input and output connections may also be emulated by a software code. The processing unit may also be emulated by an electric circuit, whereas its input and output connections may be emulated by a software code. In an aspect, the processing unit in the computational network may comprise an analog electrical circuit. In another aspect, the processing unit may comprise a digital electrical circuit. In yet another aspect, the processing unit may comprise a mixed-signal electrical circuit with both analog and digital components. The computational network may comprise processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}, \ldots, w_P^{(i,i+1)}$ from FIG. 1 and/or the weights $206_1$-$206_N$ from FIG. 2) may be initialized with random values and increased or decreased according to a learning rule. Some examples of the learning rule are the spike-timing-dependent plasticity (STDP) learning rule, the Hebb rule, the Oja rule, the Bienenstock-Copper-Munro (BCM) rule, etc. Very often, the weights may settle to one of two values (i.e., a bimodal distribution of weights). This effect can be utilized to reduce the number of bits per synaptic weight, increase the speed of reading and writing from/to a memory storing the synaptic weights, and to reduce power consumption of the synaptic memory.

Synapse Type

In hardware and software models of neural networks, processing of synapse related functions can be based on synaptic type. Synapse types may comprise non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of this is that processing can be subdivided. For example, non-plastic synapses may not require plasticity functions to be executed (or waiting for such functions to complete). Similarly, delay and weight plasticity may be subdivided into operations that may operate in together or separately, in sequence or in parallel. Different types of synapses may have different lookup tables or formulas and parameters for each of the different plasticity types that apply. Thus, the methods would access the relevant tables for the synapse's type.

There are further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) since structural plasticity (i.e., an amount of delay change) may be a direct function of pre-post spike time difference. Alternatively, it may be set as a function of the weight change amount or based on conditions relating to bounds of the weights or weight changes. For example, a synaptic delay may change only when a weight change occurs or if weights reach zero, but not if the weights are maxed out. However, it can be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as to computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity, and homeostatic plasticity.

STDP is a learning process that adjusts the strength of synaptic connections between neurons, such as those in the brain. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. In contrast, long-term depression (LTD) may occur if an input spike tends, on average, to occur immediately after an output spike. Then, that particular input is made somewhat weaker, hence the name "spike-timing-dependent plasticity." Consequently, inputs that might be the cause of the post-synaptic neuron's excitation are made even more likely to contribute in the future, whereas inputs that are not the cause of the postsynaptic spike are made less likely to contribute in the future. The process continues until a subset of the initial set of connections remains, while the influence of all others is reduced to zero or near zero.

Since a neuron generally produces an output spike when many of its inputs occur within a brief period (i.e., being sufficiently cumulative to cause the output), the subset of inputs that typically remains includes those that tended to be correlated in time. In addition, since the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a pre-synaptic neuron to a post-synaptic neuron as a function of time difference between spike time $t_{pre}$ of the pre-synaptic neuron and spike time $t_{post}$ of the post-synaptic neuron (i.e., $t=t_{post}-t_{pre}$). A typical formulation of the STDP is to increase the synaptic weight (i.e., potentiate the synapse) if the time difference is positive (the pre-synaptic neuron fires before the post-synaptic neuron), and decrease the synaptic weight (i.e., depress the synapse) if the time difference is negative (the post-synaptic neuron fires before the pre-synaptic neuron).

In the STDP process, a change of the synaptic weight over time may be typically achieved using an exponential decay, as given by, $$\Delta w(t) = \begin{cases} a_+ e^{-t/k_+} + \mu, & t > 0 \\ a_- e^{t/k_-}, & t < 0 \end{cases}, \quad (1)$$

where $k_+$ and $k_-$ are time constants for positive and negative time difference, respectively, $a_+$ and $a_-$ are corresponding scaling magnitudes ($a_-$ is typically negative by convention), and $\mu$ is an offset that may be applied to the positive time difference and/or the negative time difference.

Figure 3:
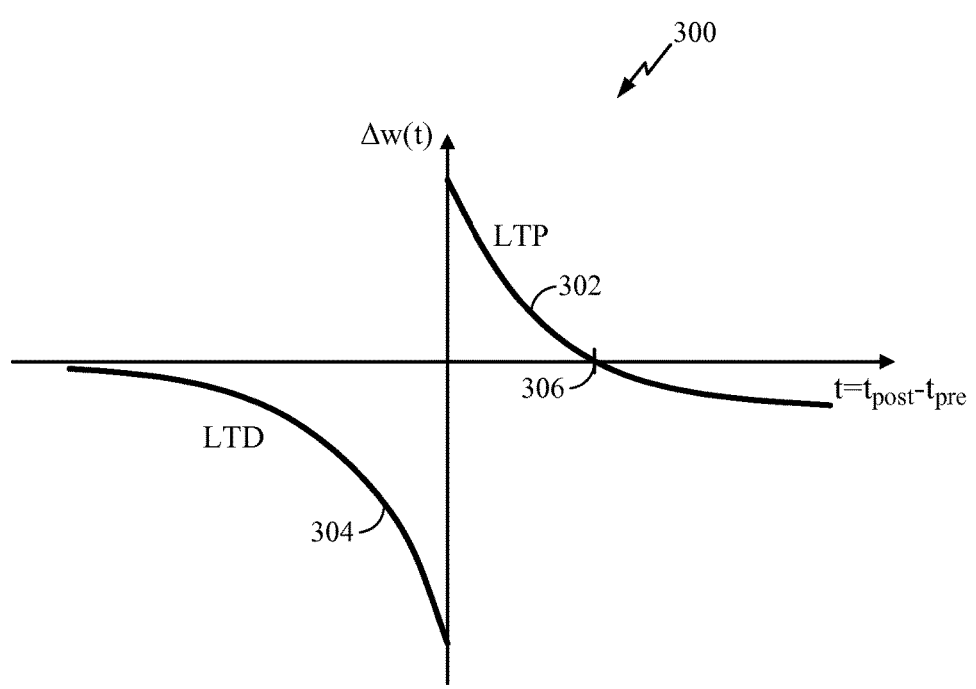
FIG. 3 illustrates an example spike-timing dependent plasticity (STDP) curve in accordance with certain aspects of the present disclosure.

FIG. 3 illustrates an example graph 300 of a synaptic weight change as a function of relative timing of pre-synaptic and post-synaptic spikes in accordance with STDP. If a pre-synaptic neuron fires before a post-synaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between pre-synaptic and post-synaptic spike times. The reverse order of firing may reduce the synaptic weight, as illustrated in a portion 304 of the graph 300, causing an LTD of the synapse.

As illustrated in the graph 300 in FIG. 3, a negative offset $\mu$ may be applied to the LTP (causal) portion 302 of the STDP graph. A point of cross-over 306 of the x-axis (y=0) may be configured to coincide with the maximum time lag for considering correlation for causal inputs from layer i−1 (presynaptic layer). In the case of a frame-based input (i.e., an input is in the form of a frame of a particular duration comprising spikes or pulses), the offset value $\mu$ can be computed to reflect the frame boundary. A first input spike (pulse) in the frame may be considered to decay over time either as modeled by a post-synaptic potential directly or in terms of the effect on neural state. If a second input spike (pulse) in the frame is considered correlated or relevant of a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset $\mu$ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two characteristics to allow temporal coding: (1) arrival time of inputs affects output time; and (2) coincidence detection has a narrow time window. Finally, to be computationally attractive, a good neuron model may have a closed-form solution in continuous time and have stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any) can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics:

$$\frac{dv_n(t)}{dt} = \alpha v_n(t) + \beta \sum_m w_{m,n} y_m(t - \Delta t_{m,n}), \quad (2)$$

where $\alpha$ and $\beta$ are parameters ($\alpha$ is typically negative by convention), $w_{m,n}$ is a synaptic weight for the synapse connecting a pre-synaptic neuron m to a post-synaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a post-synaptic neuron is established until the time when the post-synaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e., $$\frac{dv}{dt} = (k(v - v_t)(v - v_r) - u + I)/C, \quad (3)$$

$$\frac{du}{dt} = a(b(v - v_r) - u). \quad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the sub-threshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in biologically-consistent linear fashion. The time constant in the supra-threshold regime, positive by convention, reflects anti-leaky channel dynamics generally driving a cell to spike while incurring latency in spike-generation.

Figure 4:
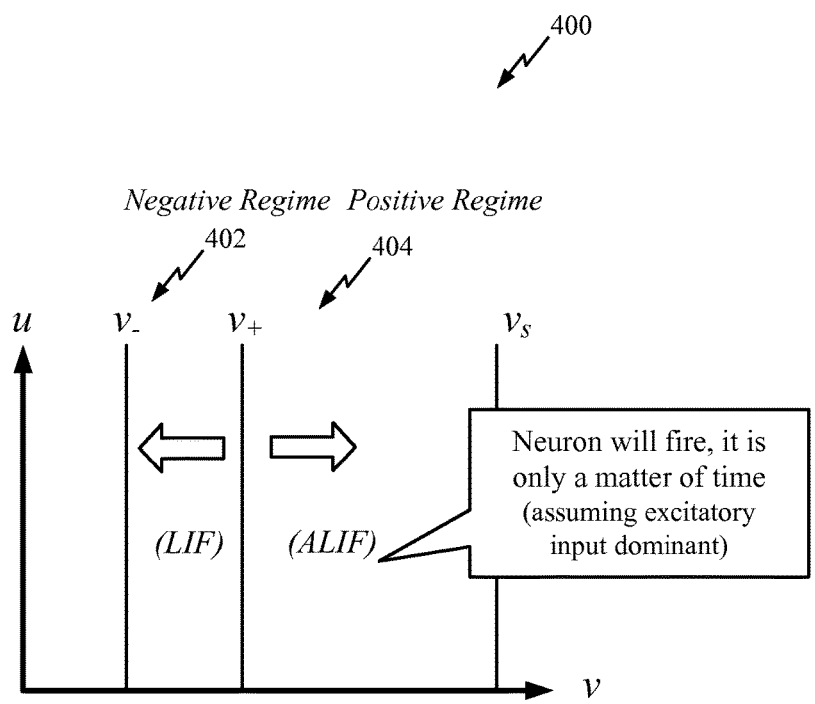
FIG. 4 is an example graph of state for an artificial neuron, illustrating a positive regime and a negative regime for defining behavior of the neuron, in accordance with certain aspects of the present disclosure.

As illustrated in the graph of recovery potential (u) versus membrane potential (v) FIG. 4, the dynamics of the model may be divided into two (or more) regimes. These regimes may be called the negative regime 402 (also interchangeably referred to as the leaky-integrate-and-fire (LIF) regime, not to be confused with the LIF neuron model) and the positive regime 404 (also interchangeably referred to as the anti-leaky-integrate-and-fire (ALIF) regime, not to be confused with the ALIF neuron model). In the negative regime 402 between the resting potential ($v_-$) and the firing threshold ($v_+$), the state tends toward rest ($v_-$) at the time of a future event. In this negative regime, the model generally exhibits temporal input detection properties and other sub-threshold behavior. In the positive regime 404 between $v_+$ and the peak voltage ($v_s$), the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as, $$\tau_\rho \frac{dv}{dt} = v + q_\rho \quad (5)$$

$$-\tau_u \frac{du}{dt} = u + r \quad (6)$$

where $q_\rho$ and r are the linear transformation variables for coupling.

The symbol ρ is used herein to denote the dynamics regime with the convention to replace the symbol ρ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include $\tau_-$ which is the negative regime time constant, and $\tau_+$ which is the positive regime time constant. The recovery current time constant $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are $$q_\rho = -\tau_\rho \beta u - v_\rho \quad (7)$$

$$r = \delta(v + \varepsilon) \quad (8)$$

where δ, ε, β and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from $v_+$ in the positive regime.

The null-clines for v and u are given by the negative of the transformation variables $q_\rho$ and r, respectively. The parameter δ is a scale factor controlling the slope of the u null-cline. The parameter ε is typically set equal to $-v_-$. The parameter β is a resistance value controlling the slope of the v null-clines in both regimes. The $\tau_\rho$ time-constant parameters control not only the exponential decays, but also the null-cline slopes in each regime separately.

The model is defined to spike when the voltage v reaches a value $v_s$. Subsequently, the state is typically reset at a reset event (which technically may be one and the same as the spike event):

$$v = \hat{v}_- \quad (9)$$

$$u = u + \Delta u \quad (10)$$

where $\hat{v}_-$ and $\Delta u$ are parameters. The reset voltage $\hat{v}_-$ is typically set to $v_-$.

By a principle of momentary coupling, a closed form solution is possible not only for state (and with a single exponential term), but also for the time required to reach a particular state. The closed form state solutions are $$v(t + \Delta t) = (v(t) + q_\rho)e^{\frac{\Delta t}{\tau_\rho}} - q_\rho \quad (11)$$

$$u(t + \Delta t) = (u(t) + r)e^{-\frac{\Delta t}{\tau_u}} - r \quad (12)$$

Therefore, the model state may be updated only upon events such as upon an input (pre-synaptic spike) or output (post-synaptic spike). Operations may also be performed at any particular time (whether or not there is input or output).

Moreover, by the momentary coupling principle, the time of a post-synaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by $$\Delta t = \tau_\rho \log \frac{v_f + q_\rho}{v_0 + q_\rho} \quad (13)$$

If a spike is defined as occurring at the time the voltage state v reaches $v_s$, then the closed-form solution for the amount of time, or relative delay, until a spike occurs as measured from the time that the voltage is at a given state v is $$\Delta t_S = \begin{cases} \tau_+ \log \frac{v_S + q_+}{v + q_+} & \text{if } v > \hat{v}_+ \\ \infty & \text{otherwise} \end{cases} \quad (14)$$

where $\hat{v}_+$ is typically set to parameter $v_+$, although other variations may be possible.

The above definitions of the model dynamics depend on whether the model is in the positive or negative regime. As mentioned, the coupling and the regime ρ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily require iterative methods or Numerical methods. An event-based implementation is also possible at a limited time resolution in a step-based simulator by only updating the model if an event occurs at or between steps or by "step-event" update.

Neural Coding

A useful neural network model, such as one composed of the levels of neurons 102, 106 of FIG. 1, may encode information via any of various suitable neural coding schemes, such as coincidence coding, temporal coding or rate coding. In coincidence coding, information is encoded in the coincidence (or temporal proximity) of action potentials (spiking activity) of a neuron population. In temporal coding, a neuron encodes information through the precise timing of action potentials (i.e., spikes) whether in absolute time or relative time. Information may thus be encoded in the relative timing of spikes among a population of neurons. In contrast, rate coding involves coding the neural information in the firing rate or population firing rate.

If a neuron model can perform temporal coding, then it can also perform rate coding (since rate is just a function of timing or inter-spike intervals). To provide for temporal coding, a good neuron model should have two characteristics: (1) arrival time of inputs affects output time; and (2) coincidence detection has a narrow time window. Connection delays provide one means to expand coincidence detection to temporal pattern decoding because by appropriately delaying elements of a temporal pattern, the elements may be brought into timing coincidence.

Arrival Time

In a good neuron model, the time of arrival of an input should have an effect on the time of output. A synaptic input—whether a Dirac delta function or a shaped postsynaptic potential (PSP), whether excitatory (EPSP) or inhibitory (IPSP)—has a time of arrival (e.g., the time of the delta function or the start or peak of a step or other input function), which may be referred to as the input time. A neuron output (i.e., a spike) has a time of occurrence (wherever it is measured, e.g., at the soma, at a point along the axon, or at an end of the axon), which may be referred to as the output time. That output time may be the time of the peak of the spike, the start of the spike, or any other time in relation to the output waveform. The overarching principle is that the output time depends on the input time.

One might at first glance think that all neuron models conform to this principle, but this is generally not true. For example, rate-based models do not have this feature. Many spiking models also do not generally conform. A leaky-integrate-and-fire (LIF) model does not fire any faster if there are extra inputs (beyond threshold). Moreover, models that might conform if modeled at very high timing resolution often will not conform when timing resolution is limited, such as to 1 ms steps.

Inputs

An input to a neuron model may include Dirac delta functions, such as inputs as currents, or conductance-based inputs. In the latter case, the contribution to a neuron state may be continuous or state-dependent.

Example Simultaneous Latency and Rate Coding for Automatic Error Correction

Rapid response times are advantageous for any system responding to environmental inputs, including spiking neuron networks engaging in stimulus discrimination. In such networks, environmental stimuli evoke stimulus-specific spike patterns across neurons in the sensory pathway. For a particular receiving neuron, a more effective stimulus not only evokes more spikes, but also tends to decrease the time to spiking onset. Because of this, stimulus discrimination can use either a spike counting metric or a measure of spiking onset (e.g., time to first spike). Each approach has its strengths and drawbacks. For example, spike counting is more robust against noise, but involves sampling for a longer period, resulting in long response latencies. Measuring response onset is much faster, but can be compromised by certain types of noise (e.g., spike timing jitter or spurious spikes).

Accordingly, what is needed are techniques and apparatus for enhanced stimulus discrimination in artificial nervous systems.

Certain aspects of the present disclosure provide a detector neuron postsynaptic to a receptor neuron (the artificial neuron receiving the stimulus, such as a sensory neuron). The detector neuron responds with a first spike to the onset of an effective stimulus (the primary response, based on a latency code) and with a second spike after an interval (the secondary response, based on a rate code). As a result, the interspike interval (ISI) is inversely proportional to the incoming spike rate and can therefore function as an "error-checking signal." If the primary response is accurate, then the artificial nervous system can expect a corresponding ISI between the primary and secondary spike. However, if the primary response occurs in error (e.g., because of spike timing jitter), then the secondary response—which carriers rate information that is more robust to noise—may signal the error with an incongruous ISI for certain aspects (or by omitting the second spike altogether for other aspects). As a result, certain aspects of the present disclosure may respond with short response latencies and may also maintain accuracy by allowing for error correction. For certain aspects, the receptor-detector neuron pair may be referred to as a sender-receiver neuron pair.

Figure 5A:
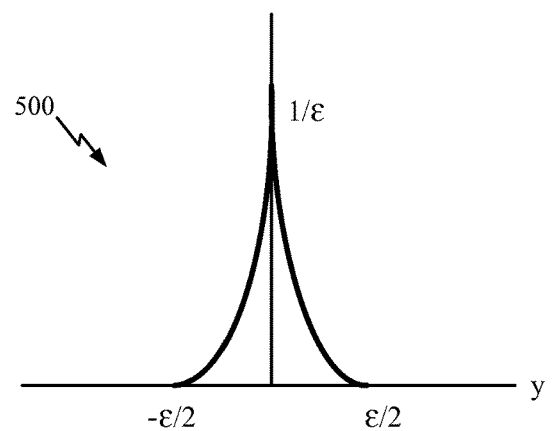
FIGS. 5A-5C illustrate various post-synaptic potential functions, in accordance with certain aspects of the present disclosure.
Figure 5B:
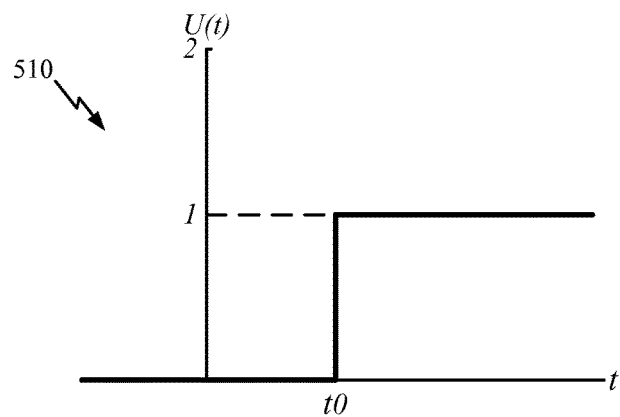
Figure 5C:
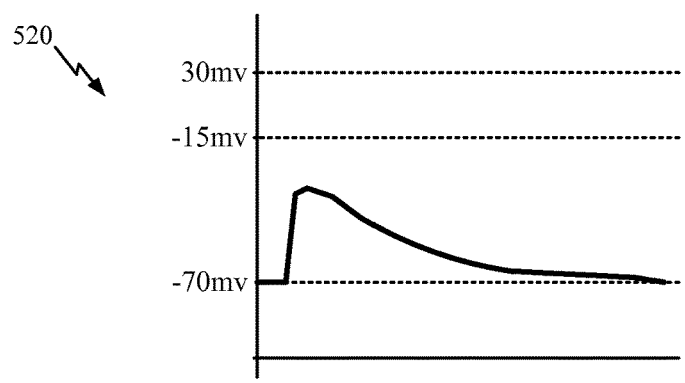

FIGS. 5A-5C illustrate various postsynaptic potential (PSP) functions, in accordance with certain aspects of the present disclosure. The PSP 500 in FIG. 5A is a Dirac-delta function, which leads to the artificial neuron functioning as a zero memory coincident detector when input spikes are convolved with PSP 500 in a filter block, for example. The PSP 510 in FIG. 5B is a step function between two DC levels, which leads to the artificial neuron functioning as an infinite memory event counter when input spikes are convolved with this PSP 510. The PSP 520 in FIG. 5C combines features of the two previous functions, exhibiting a fast rise time, but a slow decay. As a result, the artificial neuron with this PSP 520 may be used for computing both coincidents and event counting, with a fast rise time for detecting the coincident (spike-timing decoding) and a slow decay for counting events in a limited time window (rate decoding).

Figure 6:
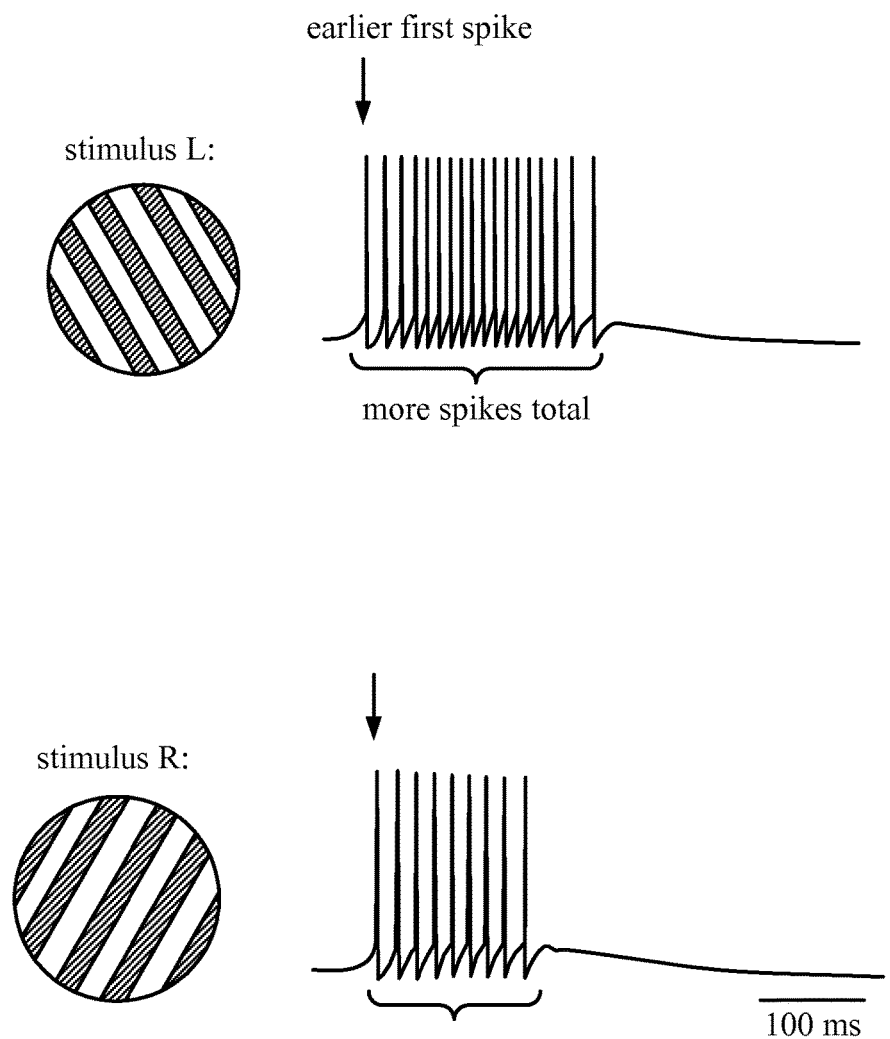
FIG. 6 illustrates example neural responses to two different visual stimuli and various response metrics to differentiate the stimuli, in accordance with certain aspects of the present disclosure.

FIG. 6 illustrates example neural responses to two different visual stimuli and various response metrics to differentiate the stimuli, in accordance with certain aspects of the present disclosure. The spike train response of an artificial neuron is a function of the stimulus and the receptive field of the neuron. In this example, the orientation of stimulus L matches that of the receptive field of the neuron, and the neural response is rapid and strong, featuring an early first spike and a high spike count. In contrast, when the orientation of the stimulus does not closely match the orientation of the receptive field (as with stimulus R), the neuron responds with a later first spike and fewer total spikes.

Stimuli are typically coded according to when spikes occur or how many spikes occur. Metrics to differentiate stimuli include the time response onset (e.g., earlier first spike in response to stimulus L compared to stimulus R), the total evoked spike count (e.g., more total spikes for stimulus L compared to stimulus R), or a hybrid therebetween. Using the time to onset is faster, but may be less reliable due to timing jitter or dropped spikes, for example. In contrast, the total evoked spike count method is slower, but may be more reliable, because more spikes are used to represent the underlying signal. A hybrid method may invoke speed versus accuracy tradeoffs.

Figure 7:
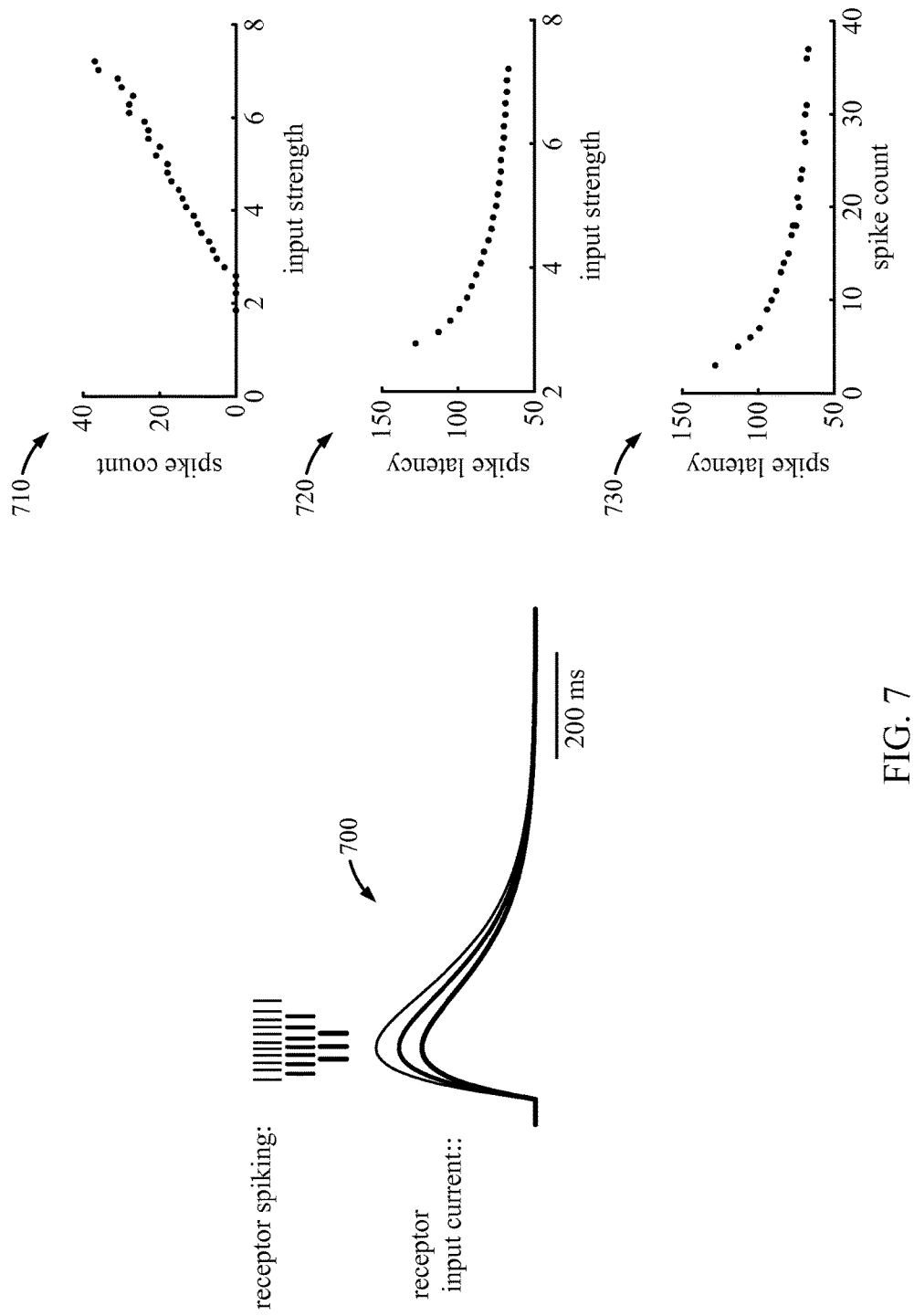
FIG. 7 illustrates three different input currents and correlations between input strength, spike count, and spike latency, in accordance with certain aspects of the present disclosure.

FIG. 7 illustrates example input currents to a receptor neuron at three different input strengths in the graph 700, in accordance with certain aspects of the present disclosure. Increasing input strength may increase spike count as depicted in the graph 710 and decrease spike latency as portrayed in the graph 720. This may result in a correlation between spike count and spike latency, as shown in the graph 730.

Figure 8:
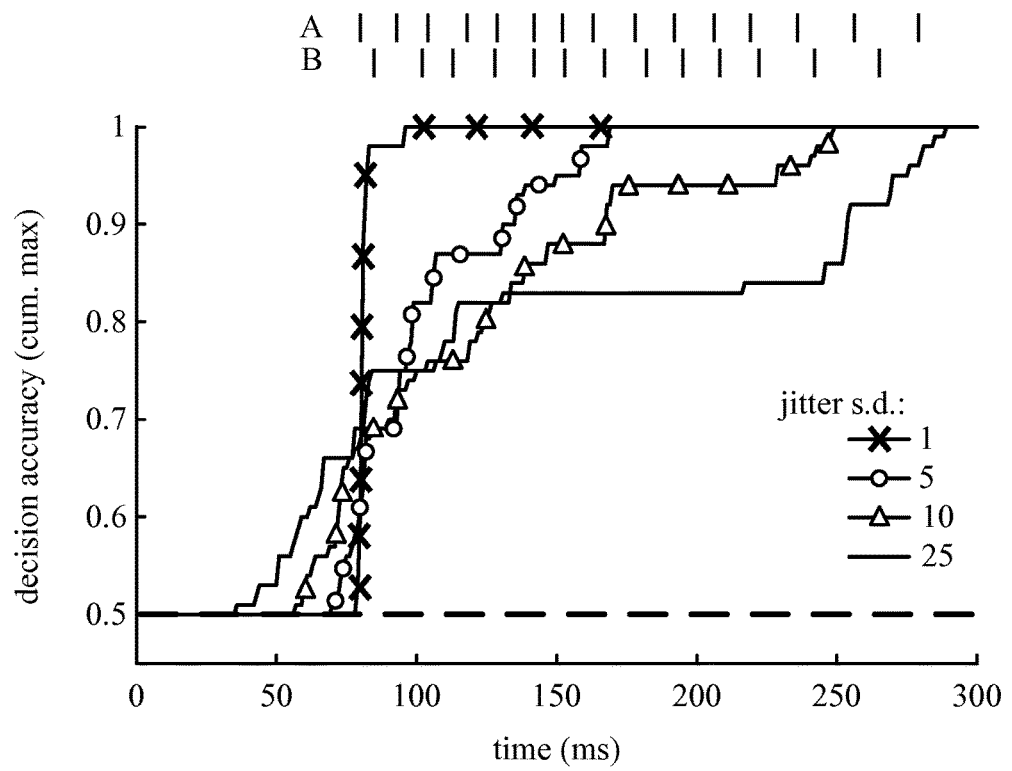
FIG. 8 illustrates an example tradeoff between speed and accuracy when discriminating between different stimuli, in accordance with certain aspects of the present disclosure.

FIG. 8 illustrates an example tradeoff between speed and accuracy when discriminating between different stimuli, in accordance with certain aspects of the present disclosure. The confidence of discrimination between stimulus spike trains A and B is plotted over time, under several different noise (jitter) conditions. Accuracy at a particular decision time is equal to this confidence value. With low jitter, accuracy jumps from 0.5 (chance) to ~1.0 immediately after stimulus onset. With higher jitter, accuracy remains low until all spikes have been counted (i.e., the end of the stimulus). Thus, with noise, a more accurate method is typically slower (involving spike counting), while a faster method (following the stimulus onset) may be less accurate. Rather than forcing the use of a single method, aspects of the present disclosure support the use of two methods in parallel (e.g., a fast initial component followed by a slower component that is more robust to noise, effectively "sampling" this speed-accuracy curve at multiple points).

Figure 9:
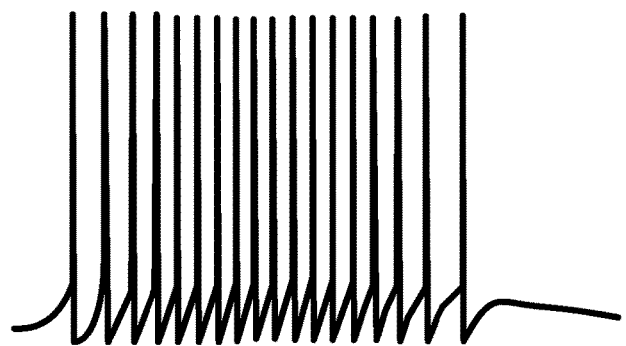
FIG. 9 illustrates example operation of a detector neuron that responds to a stimulus with a pair of spikes separated by an interspike interval (ISI), in accordance with certain aspects of the present disclosure.
Figure 9:
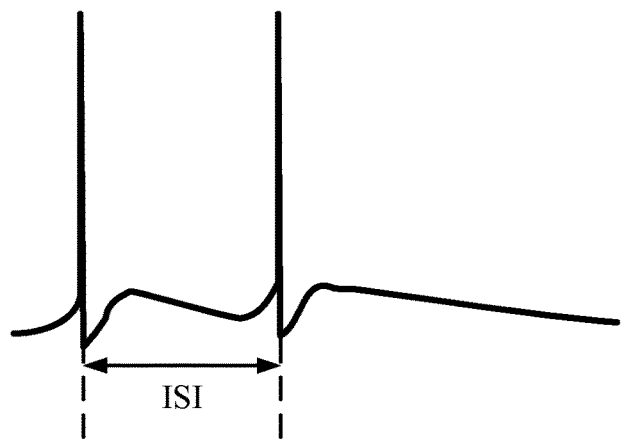

FIG. 9 illustrates example operation of a detector neuron that responds to a stimulus with a pair of spikes separated by an interspike interval (ISI), in accordance with certain aspects of the present disclosure. The latency of the first spike codes for the initial estimate of the signal strength based on input spike latency, and the ISI codes for the subsequent estimate of the signal strength based on spike rate of the input. The latency of the first spike is a faster, less reliable metric that provides an early best guess of the identified stimulus. The ISI between two spikes of the detector neuron is a slower, more reliable metric, which may be used for error correction in certain aspects of the present disclosure.

Figure 10:
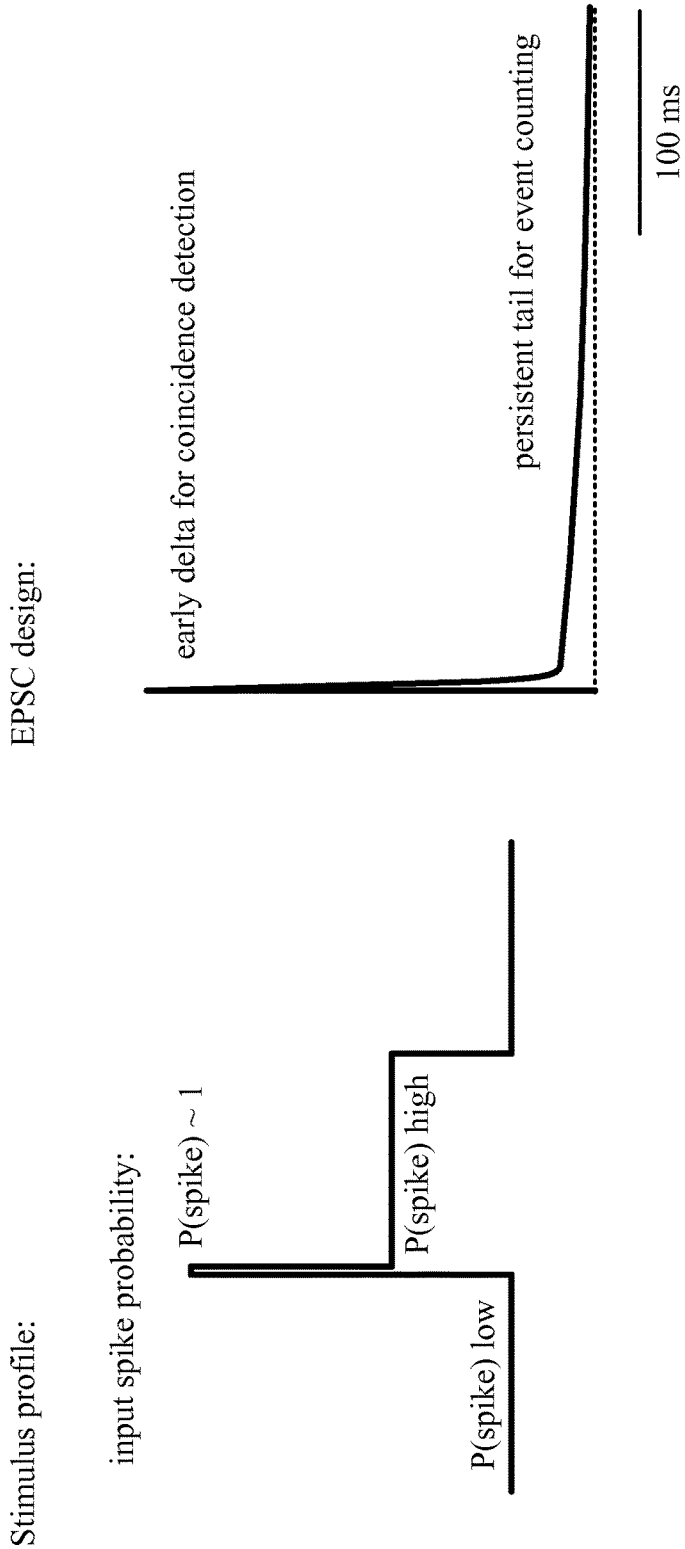
FIG. 10 illustrates an excitatory postsynaptic current (EPSC) shape for enabling simultaneous coincidence detection and event counting for this stimulus profile, in accordance with certain aspects of the present disclosure.

FIG. 10 illustrates an example stimulus profile and an excitatory postsynaptic current (EPSC) shape for enabling simultaneous coincidence detection and event counting for this stimulus profile, in accordance with certain aspects of the present disclosure. In this stimulus profile, stimulus onset is indicated with transient coincident spiking (with spike probability P(spike)~1.0), followed by a period of constant spike probability p for the duration of the stimulus. The EPSC shape has an early delta for coincidence detection (for this stimulus, allowing detection of stimulus onset) and a persistent tail for event counting (for this stimulus, allowing encoding of p).

Figure 11:
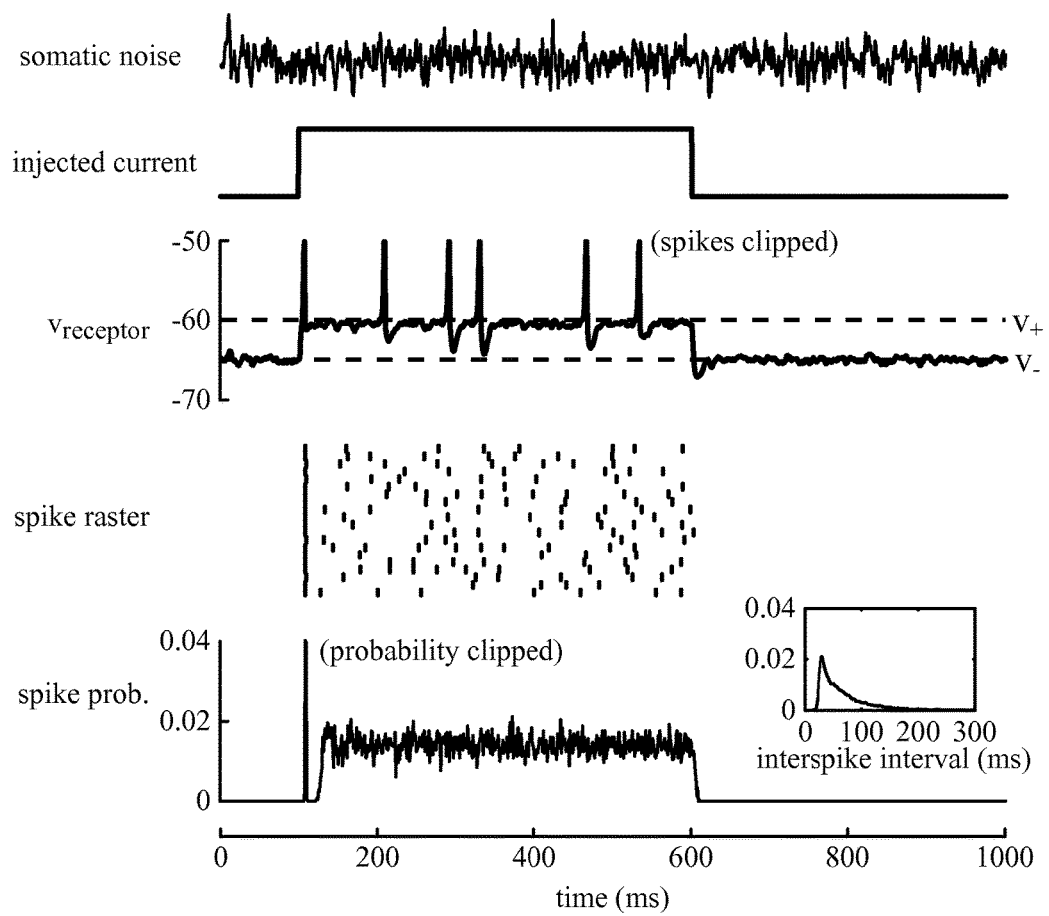
FIG. 11 illustrates operation of an example receptor neuron demonstrating the stimulus profile from FIG. 10, in accordance with certain aspects of the present disclosure.

FIG. 11 illustrates operation of an example receptor neuron demonstrating the stimulus profile from FIG. 10, in accordance with certain aspects of the present disclosure. In this example, a square current (indicating the duration and strength of the stimulus) is injected into the receptor neuron, which depolarizes and spikes immediately after stimulus onset, and thereafter generates spikes periodically (as a result of intrinsic somatic noise). The spike raster shows example spiking from 20 such receptor neurons receiving identical current injection, but with different somatic noise, and the spike probability histogram shows the spiking profile across a large population of such neurons. As in FIG. 10, a population of these neurons demonstrates coincident firing upon stimulus onset (spike probability ~1.0), followed by persistent firing (spike probability ~0.015) for the duration of the stimulus. The inset ISI histogram shows that spiking is approximately Poisson, with a refractory period.

Figure 12:
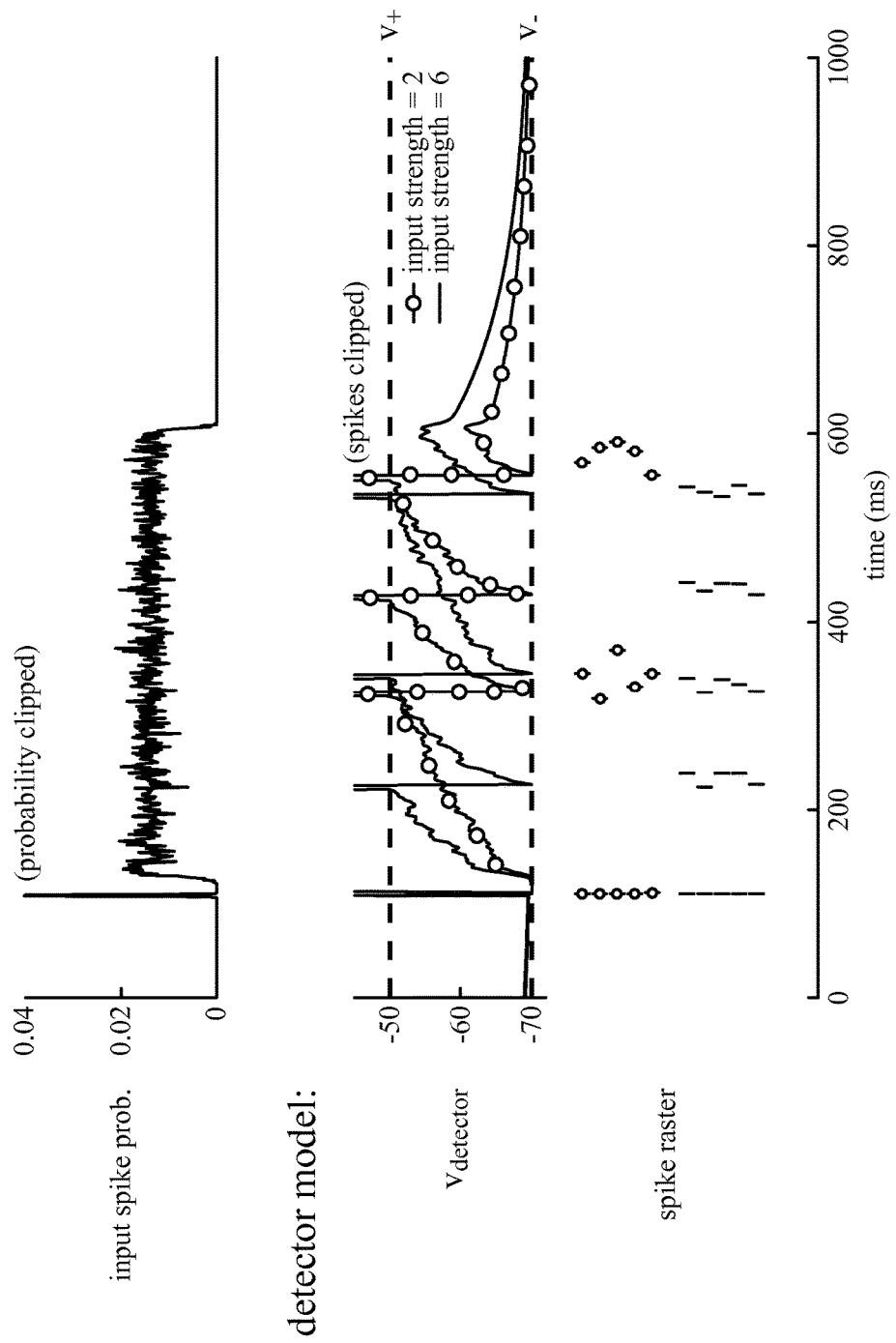
FIG. 12 illustrates operation of an example detector neuron, which implements the example EPSC design from FIG. 10 and, thus, functions as both a coincidence detector and an event counter, in accordance with certain aspects of the present disclosure.

FIG. 12 illustrates operation of an example detector neuron, which implements the example EPSC design from FIG. 10 and, thus, functions as both a coincidence detector and an event counter, in accordance with certain aspects of the present disclosure. In this example, the detector neuron receives input from the population of receptor neurons with behavior as in FIG. 11. The detector neuron spikes once at stimulus onset and then begins counting spikes, showing a characteristic "stair step" counting behavior in its membrane potential ($v_{detector}$). Increasing input strength (from 2 to 6 in this example) results in higher persistent input spike probability, and the event counter reaches threshold faster, resulting in shorter ISIs. The spike raster shows 5 trials of each input strength and demonstrates the robustness of ISI encoding of input strength.

Figure 13:
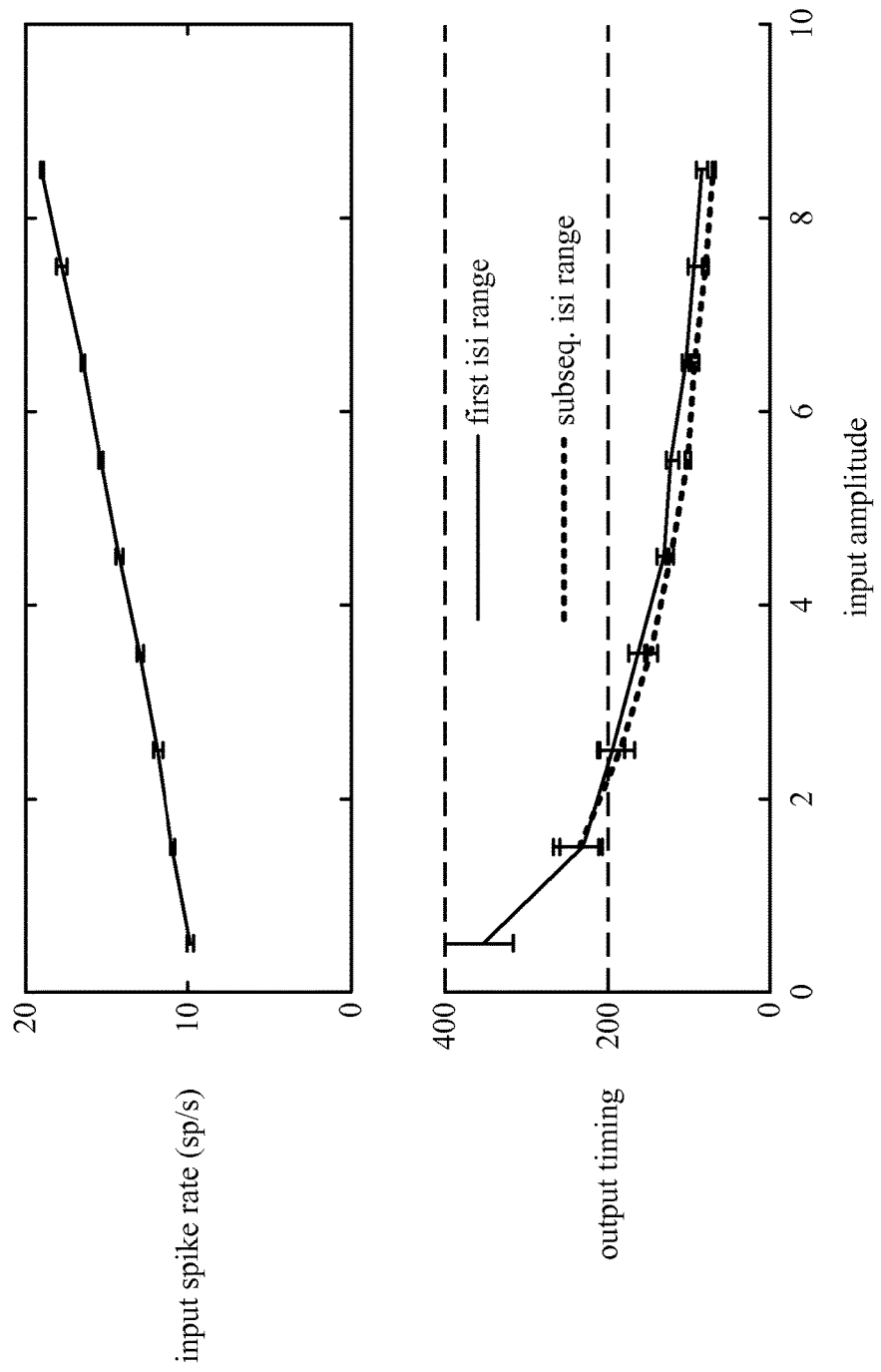
FIG. 13 illustrates graphs of input spike rate and ISIs for the example detector neuron behavior of FIG. 12, in accordance with certain aspects of the present disclosure.

FIG. 13 illustrates graphs of input spike rate and ISIs for the example detector neuron behavior of FIG. 12, in accordance with certain aspects of the present disclosure. FIG. 13 demonstrates that ISI can reliably encode input strength.

Figure 14:
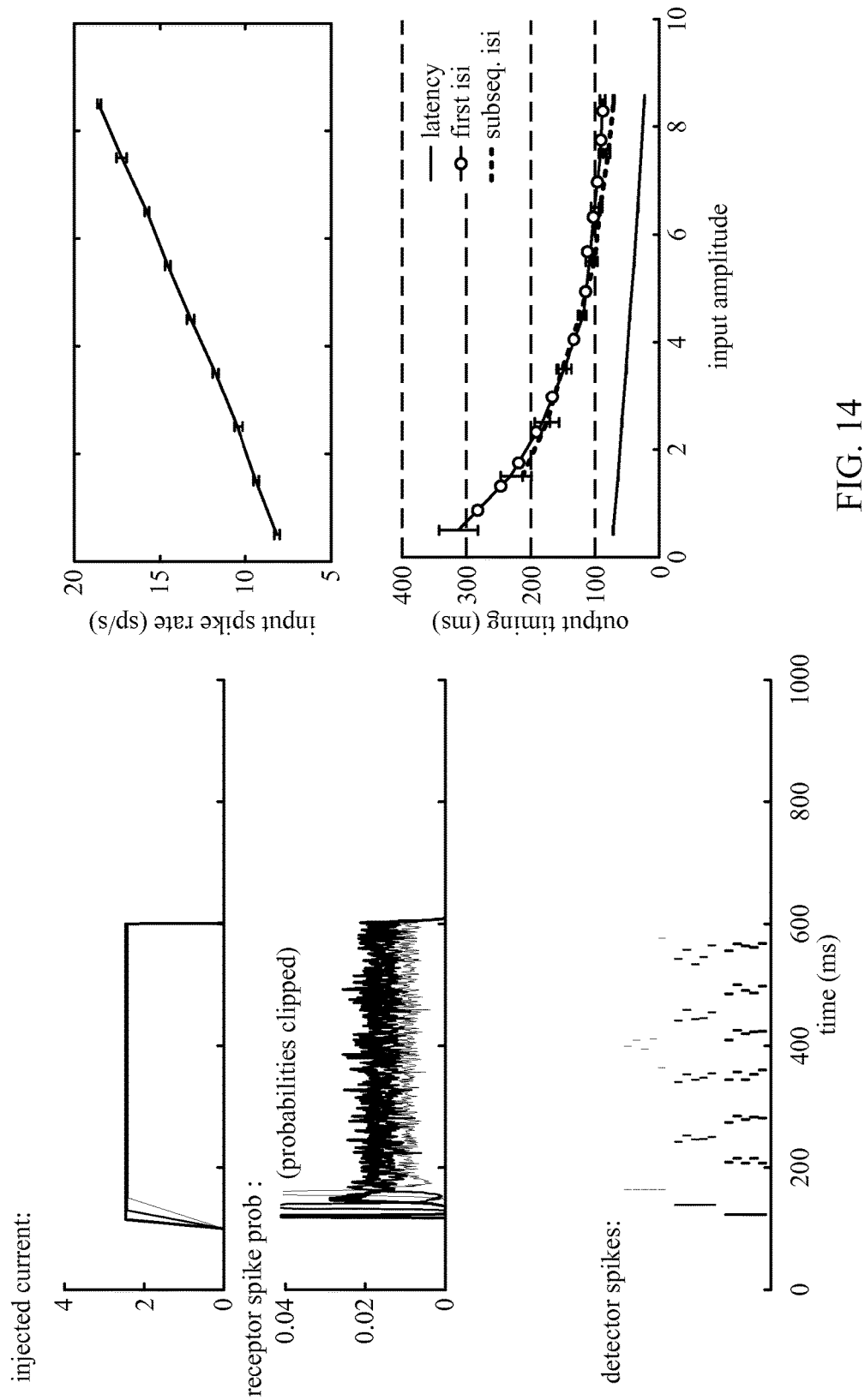
FIG. 14 illustrates an example of using latency and rate coding simultaneously, in accordance with certain aspects of the present disclosure.

FIG. 14 illustrates an example of using latency and rate coding simultaneously, in accordance with certain aspects of the present disclosure. Receptor neuron design (top left) is similar to the example in FIG. 11, but here, the magnitude of injected current and onset slope are varied together, resulting in stimuli in which the initial coincident spiking occurs at a characteristic latency as a function of input strength. The thicker the line width in the graph is, the higher the magnitude of injected current and the greater the onset slope are. As before, the persistent probability of spiking (middle left) is also a function of input strength. The example detector neuron (lower left) generates an initial spike at stimulus onset (demonstrating a latency code), as well as subsequent spikes with ISIs that are a function of input strength. Latencies and ISIs (right) both demonstrate reliable encoding across a range of input strengths.

Figure 15:
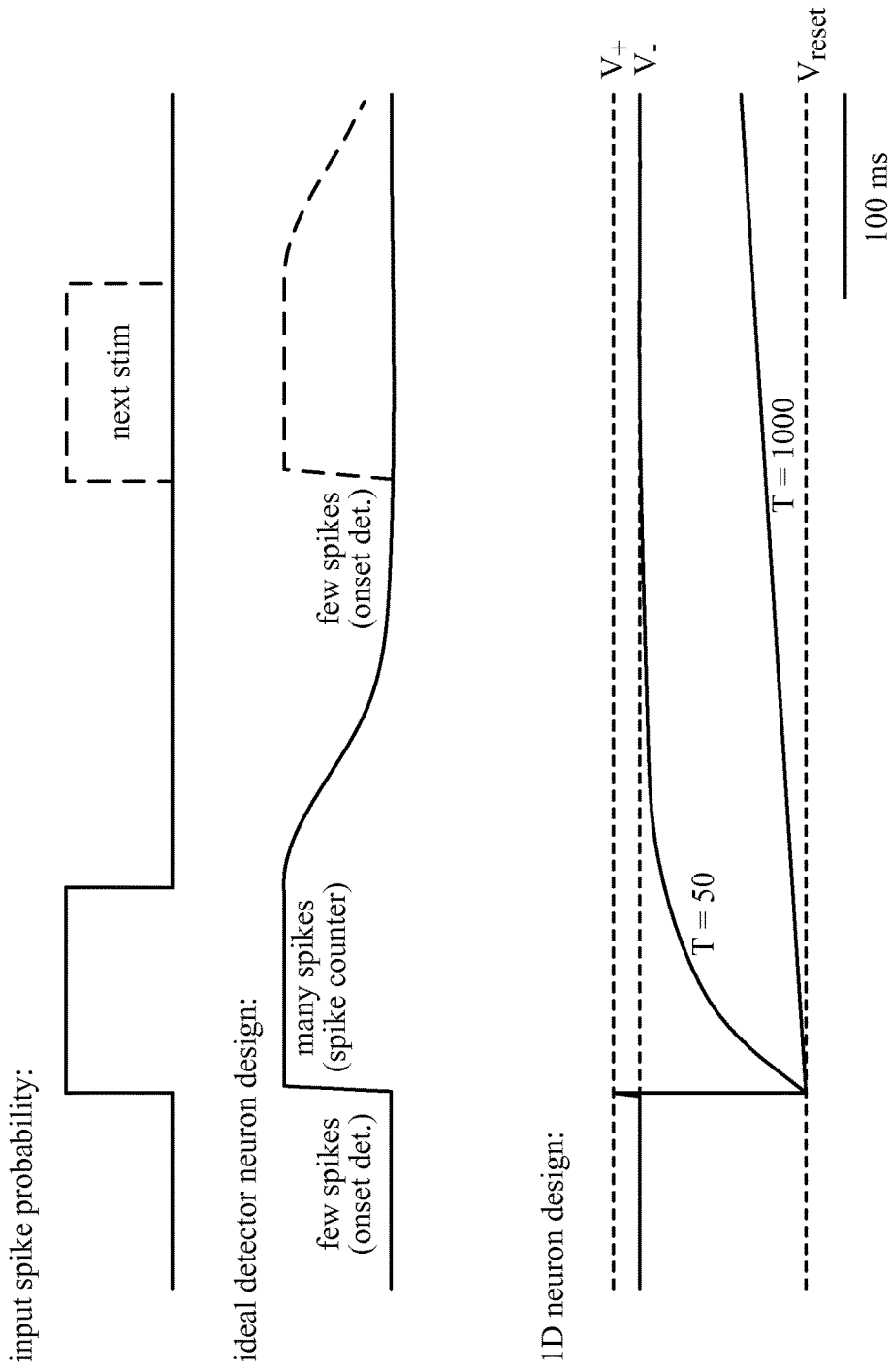
FIG. 15 illustrates another example stimulus profile and an example one-dimensional (1D) detector neuron design for enabling onset detection and event counting in a single neuron for this stimulus profile, in accordance with certain aspects of the present disclosure.

FIG. 15 illustrates another example stimulus profile and an example detector neuron design for enabling onset detection and event counting in a single neuron for this stimulus profile, in accordance with certain aspects of the present disclosure. For this stimulus, there is no initial coincident spiking; the input spike probability (top) is flat across the stimulus duration. An ideal detector neuron (middle) may initially act as an onset detector with a low threshold. After the first detector spike (indicating stimulus onset), the threshold may increase, transforming the detector neuron to a spike counter. Following stimulus offset, the neuron may return to a low-threshold onset detector mode. This ideal detector neuron may be approximately implemented, for example, with a one-dimensional (1D) neuron design (bottom). The steady-state $v_-$ is close to threshold ($v_+$), defining a low-threshold onset detector mode. However, $v_{reset}$ is set much lower than $v_-$, briefly raising the effective threshold (into spike-counting mode) following each detector neuron spike. However, a 1D neuron design typically only has one time constant that can be varied. The neuron design with a time constant of 50 quickly returns to onset detector mode, which may be undesirable for a persistent spike-counting mode. The neuron design with a time constant of 1000 provides a much more stable spike-counting mode, but this design may not be recover in time for the next stimulus, as illustrated in FIG. 15. The ideal detector neuron allows a much sharper transition between modes.

Figure 16:
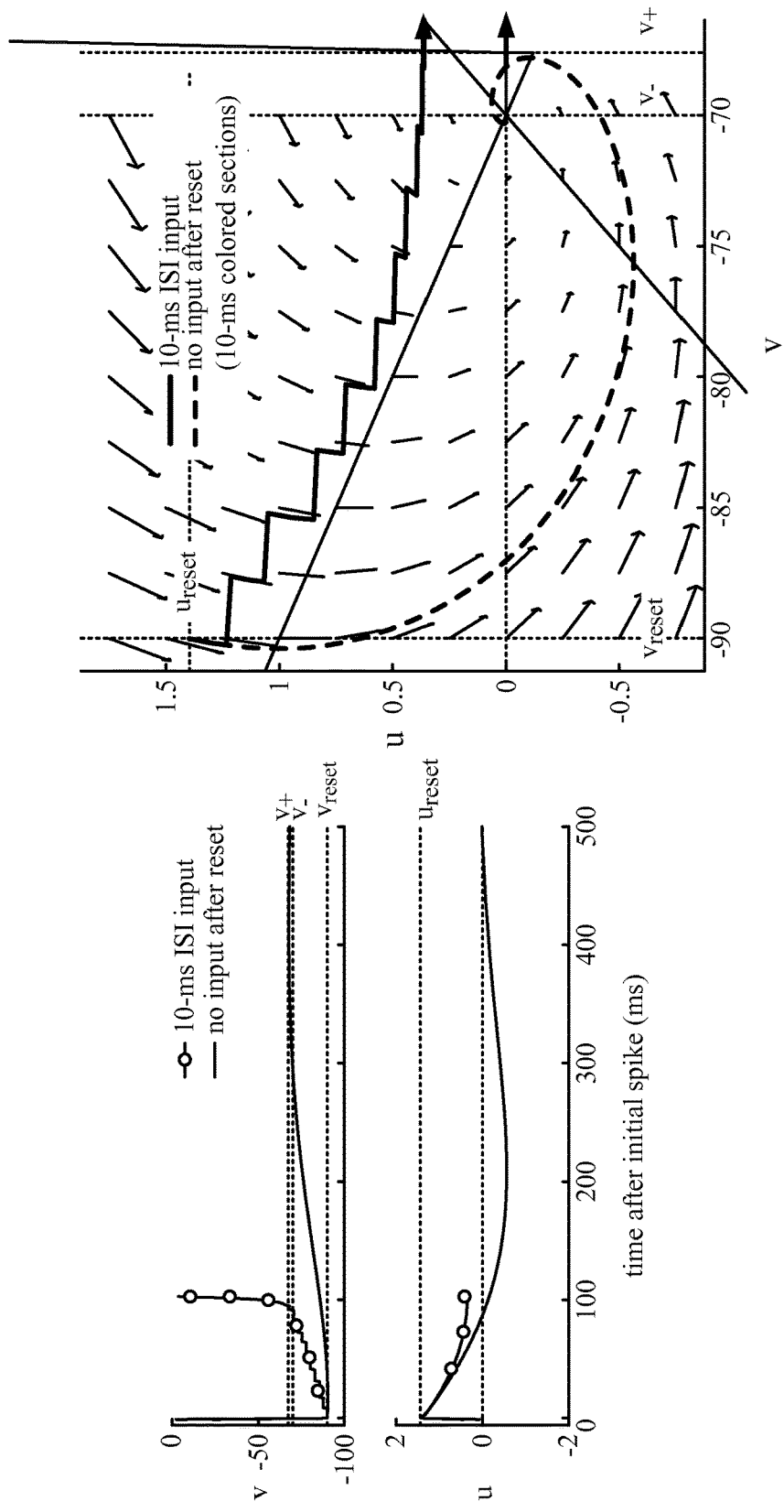
FIG. 16 illustrates an example two-dimensional (2D) neuron design, in accordance with certain aspects of the present disclosure.

FIG. 16 illustrates an example two-dimensional (2D) neuron design (with membrane potential v and recovery variable u) that allows a sharper transition between onset detection and spike counting modes, in accordance with certain aspects of the present disclosure. By using two coupled state variables with multiple time constants, the shape of the voltage recovery after reset can be fashioned closer to the desired shape than with the 1D neuron design.

Figure 17:
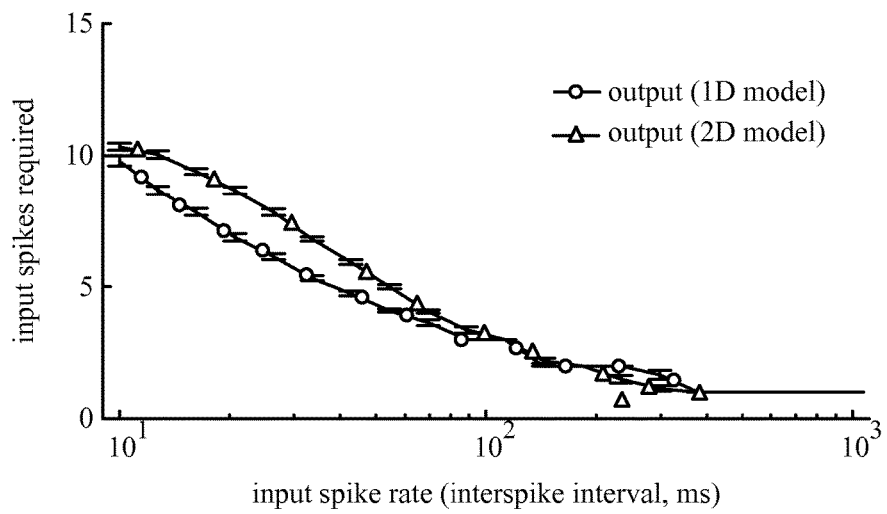
FIG. 17 illustrates the example 2D neuron of FIG. 16 providing sharper transition between onset detector/counter behavior than the example 1D neuron of FIG. 15, in accordance with certain aspects of the present disclosure.

FIG. 17 illustrates the example 2D neuron of FIG. 16 providing sharper transition between onset detector/counter behavior than the example 1D neuron of FIG. 15, in accordance with certain aspects of the present disclosure. In this example, behavior is measured by the number of input spikes sufficient to evoke a detector neuron spike, as a function of input ISI. In this configuration, the ideal behavior at longer input ISIs is to respond after a single input spike, while the ideal behavior at shorter input ISIs is to respond after ten input spikes. The 2D neuron has a steeper transition between these behavior modes.

Figure 18:
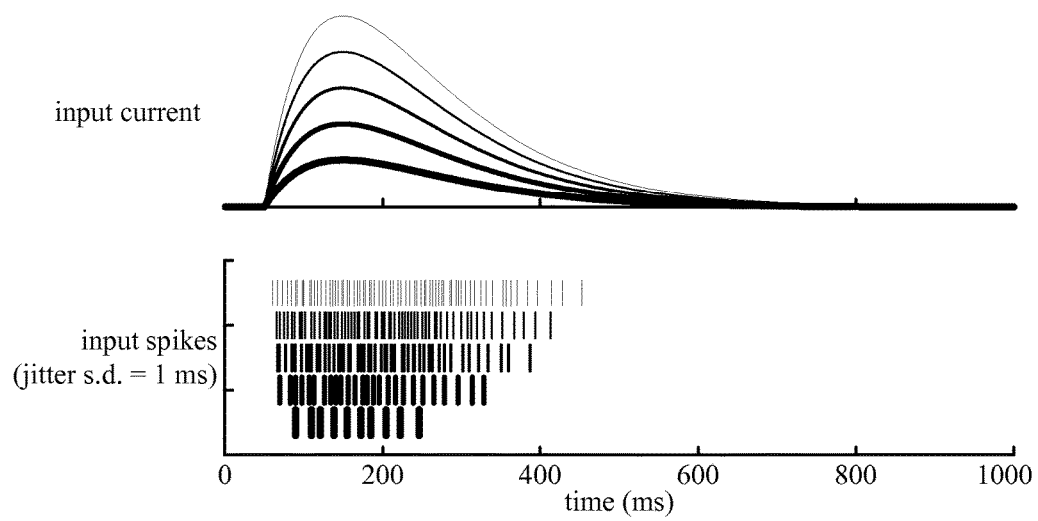
FIG. 18 illustrates an example of using latency and rate coding simultaneously in the example 2D detector neuron of FIG. 16, in accordance with certain aspects of the present disclosure.
Figure 18:
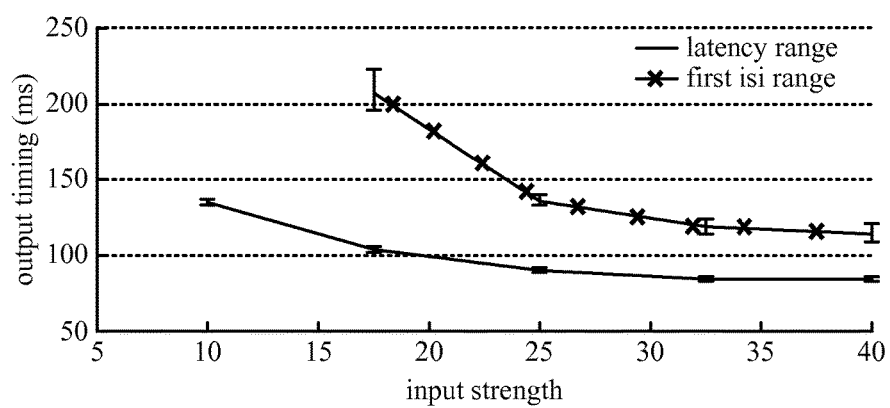

FIG. 18 illustrates an example of using latency and rate coding simultaneously in the example 2D detector neuron of FIG. 16, in accordance with certain aspects of the present disclosure. In this example, input trains are generated by injecting a double-exponential input current (top) into a receptor neuron, which spikes at different onset latencies and rates (middle) depending on the input strength. In the example 2D detector neuron, both first spike latency and ISI encode for input strength (bottom).

Figure 19:
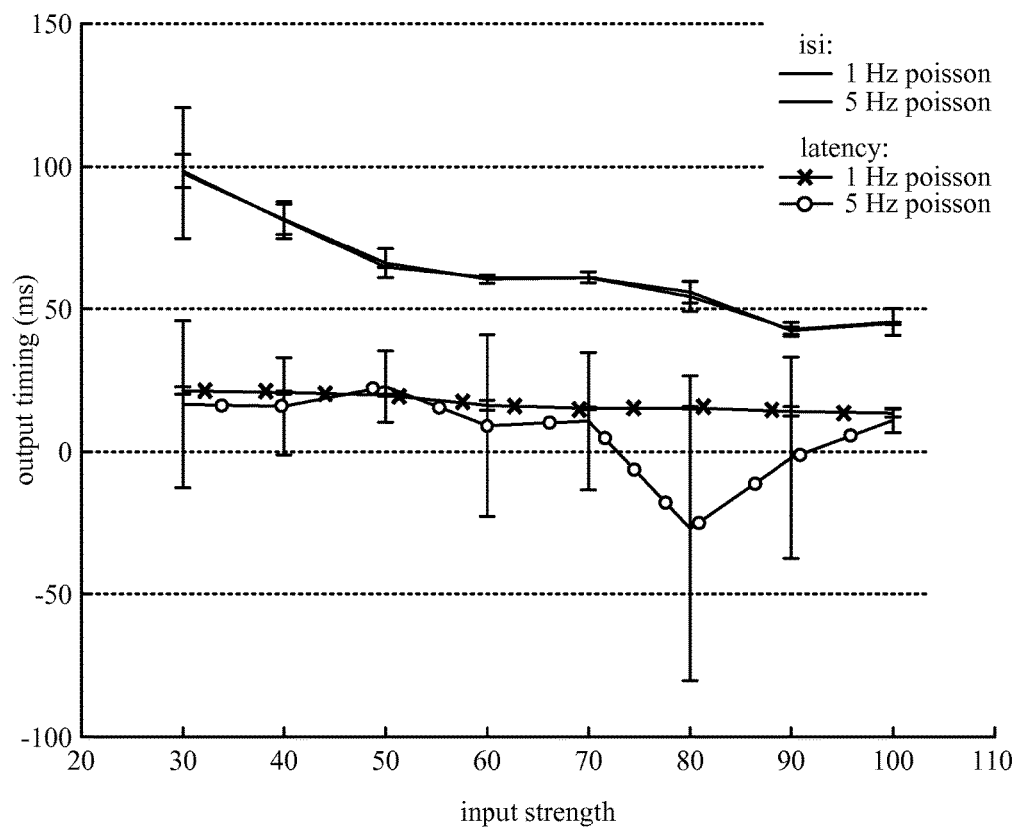
FIGS. 19 and 20 are graphs of output timing versus input strength, illustrating an example of how the later ISI encoding can remain robust when noise disrupts the earlier latency coding, in accordance with certain aspects of the present disclosure.
Figure 20:
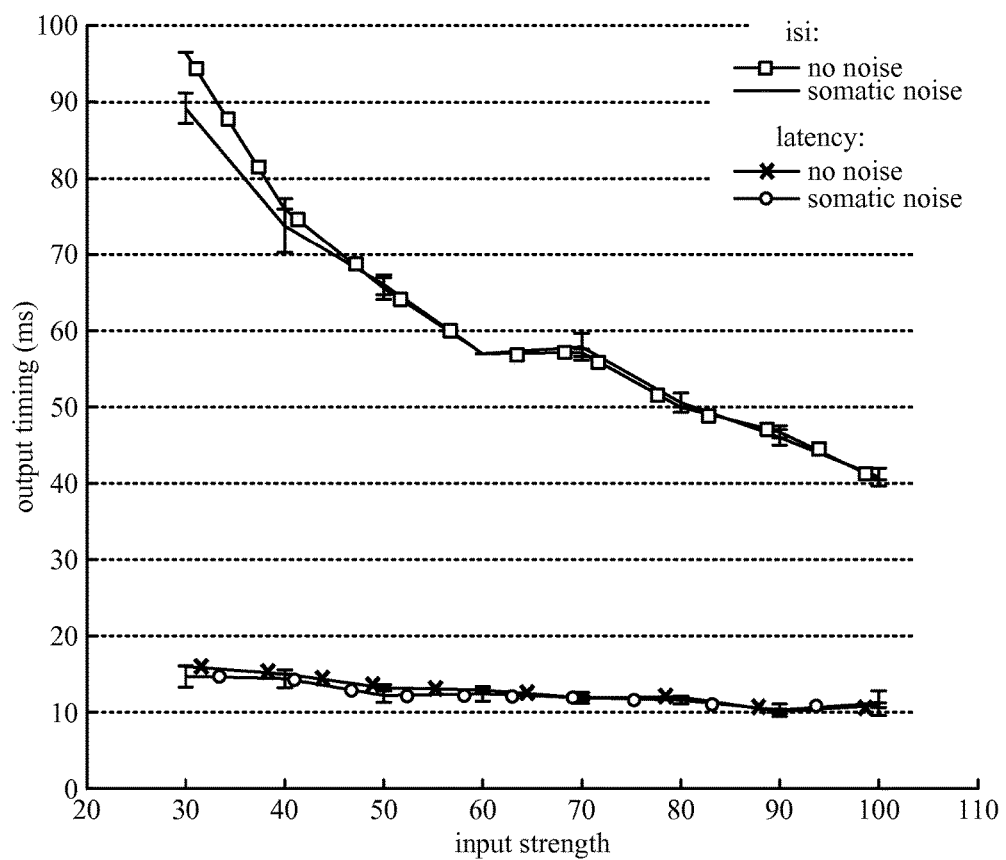

FIGS. 19 and 20 are graphs of output timing versus input strength, illustrating an example of how the later ISI encoding can remain robust when noise disrupts the earlier latency coding, in accordance with certain aspects of the present disclosure. In FIG. 19, background Poisson spikes are added to the receptor neuron spikes. In FIG. 20, somatic noise is injected into the receptor neurons, which can affect the spike timing.

Figure 21:
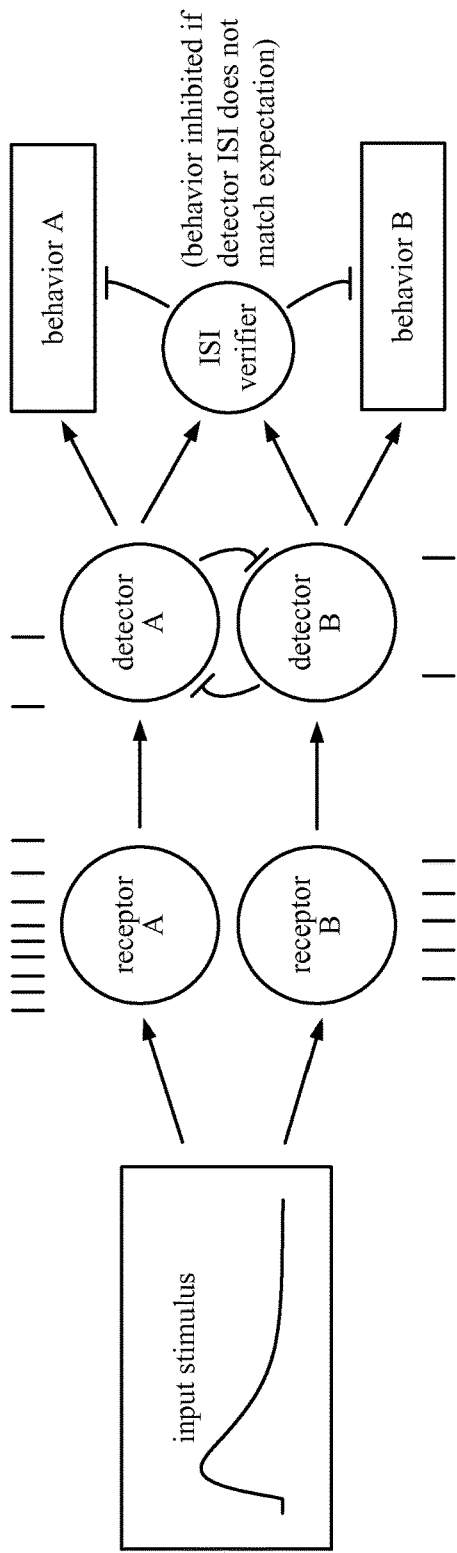
FIG. 21 illustrates a portion of an example artificial nervous system that uses both latency and spike count information to identify stimuli, in accordance with certain aspects of the present disclosure.

FIG. 21 illustrates a portion of an example artificial nervous system that uses both latency and spike count information to identify stimuli and make a binary decision, in accordance with certain aspects of the present disclosure. The earlier response (the first spike) from the detector neuron provides the initial best guess of stimulus identity immediately after stimulus onset (using a latency or relative latency code), and lateral inhibition between the detector neurons provides a winner-takes-all setup. The timing of this first spike may be affected by noise (e.g., jitter). The later response (the second spike) from the detector neuron allows for error correction. The timing of this second spike is more robust to noise, because it integrates information over a longer period (e.g., spike counting). A behavior (e.g., behavior A or behavior B) of the artificial nervous system that is initially triggered by the early "best guess" signal may be ultimately inhibited if the ISI from the detector neuron spikes does not match expectations based on the first spike from the detector neuron. For certain aspects, a temporal code module may be used to identify the input stimulus.

Figure 22:
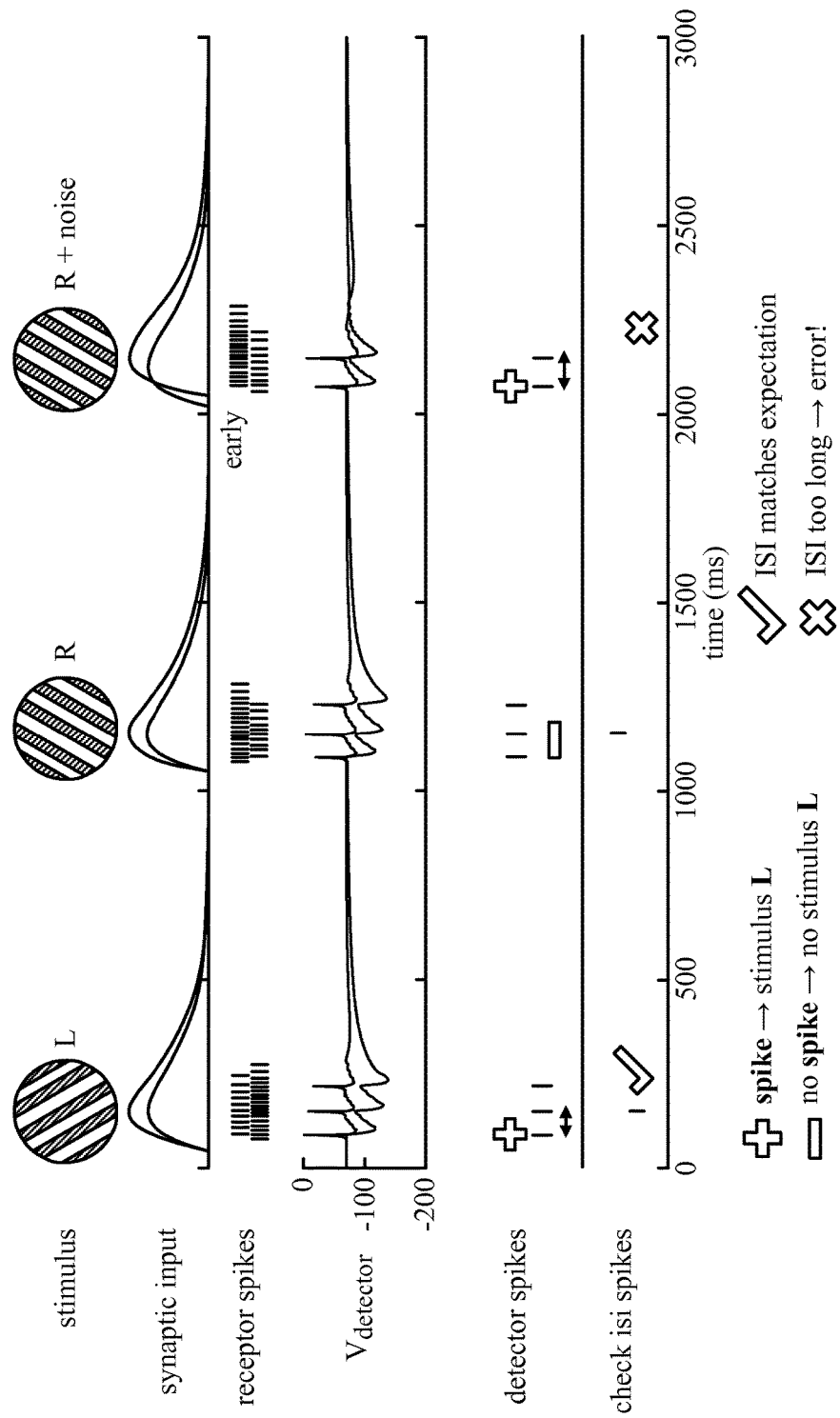
FIG. 22 illustrates an example of stimulus identification error indicated by the interspike interval in the example artificial nervous system of FIG. 21, in accordance with certain aspects of the present disclosure.

FIG. 22 illustrates an example of stimulus identification error indicated by the ISI in the example artificial nervous system of FIG. 21, in accordance with certain aspects of the present disclosure. The symbols indicate the correct or incorrect identification of stimulus L. In the first trial, stimulus L is presented and correctly identified by the first L detector spike. The detector ISI in this trial supports this identification (the "check ISI" neuron spikes). In the second trial, stimulus R is presented, and the L detector does not spike. In the third trial, stimulus R is presented, but the latencies are jittered such that the L detector (incorrectly) spikes. In this trial, the L detector ISI is incongruous with stimulus L, and thus the "check ISI" neuron does not spike, indicating the error in the initial detection.

Figure 23:
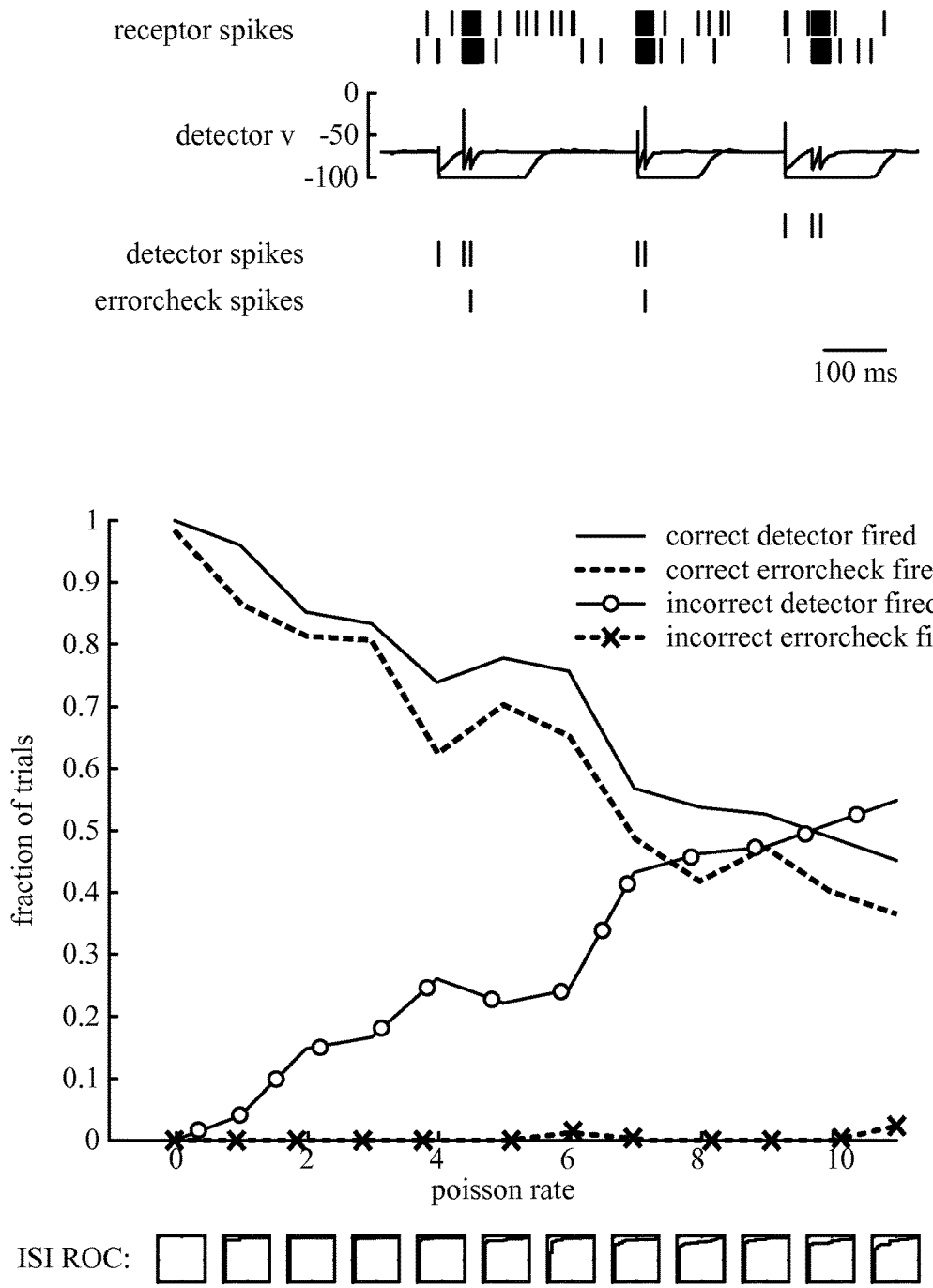
FIG. 23 illustrates an example of detecting errors in the latency code in the example artificial nervous system of FIG. 21, in accordance with certain aspects of the present disclosure.

FIG. 23 illustrates an example of detecting errors in the latency code in the example artificial nervous system of FIG. 21, in accordance with certain aspects of the present disclosure. Poisson spikes are added to the receptor neuron spikes (top), which disrupts the ability of the detector neuron to correctly identify the stimulus. As the Poisson rate is increased, the fraction of detector neuron failures ("incorrect detector fired") increases (middle). However, in these cases, the ISI error checking does not fire and, thus, the false positive rate ("incorrect errorcheck fired") remains close to zero. The ROC curves using ISI (bottom) indicate that stimuli are separable up to high Poisson noise rates.

Figure 24:
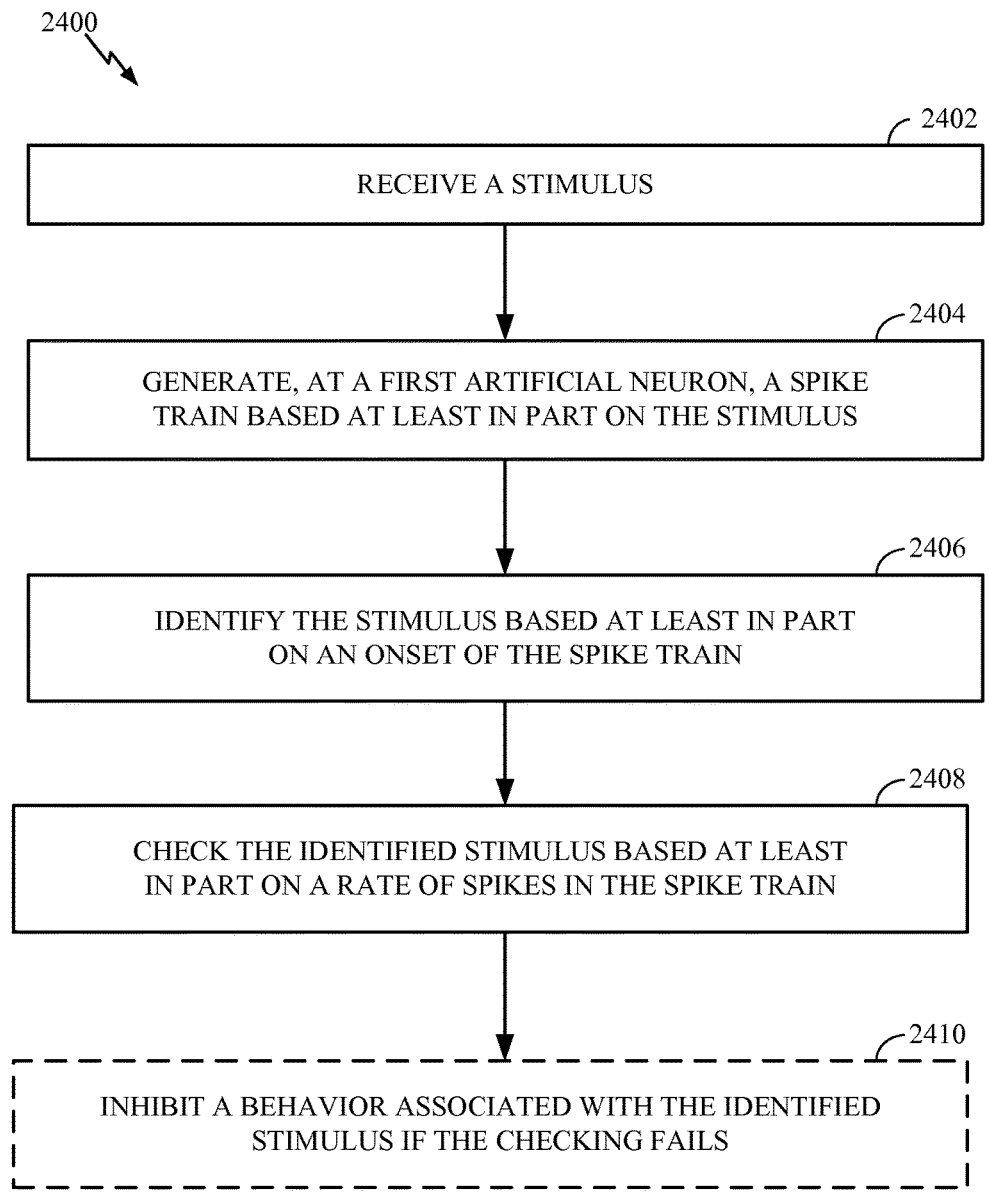
FIG. 24 is a flow diagram of example operations for operating an artificial nervous system, in accordance with certain aspects of the present disclosure.

FIG. 24 is a flow diagram of example operations 2400 for operating an artificial nervous system, in accordance with certain aspects of the present disclosure. The operations 2400 may be performed in hardware (e.g., by one or more neural processing units, such as a neuromorphic processor), in software, or in firmware. The artificial nervous system may be modeled on any of various biological or imaginary nervous systems, such as a visual nervous system, an auditory nervous system, the hippocampus, etc.

The operations 2400 may begin, at 2402, with the artificial nervous system (or one or more artificial neurons or synapses therein) receiving a stimulus. At 2404, a first device may generate a spike train of two or more spikes based, at least in part, on the stimulus received at 2402. The first device may include, for example, a receptor artificial neuron, a transducer, or a sensor that converts analog signals into spikes. At 2406, the stimulus is identified based, at least in part, on an onset of the spike train (e.g., the time to the initial spike in the spike train). At 2408, the identified stimulus is checked based, at least in part, on a rate of the spikes (or a number of the spikes, i.e., a spike count) in at least a portion of the spike train.

According to the certain aspects, the operations 2400 may further include the artificial nervous system inhibiting or correcting a behavior associated with the identified stimulus if the checking at 2408 fails.

According to certain aspects, identifying the stimulus at 2406 may include generating, at a second device (e.g., an artificial neuron), a first spike based (at least in part) on the onset of the spike train. In this case, the operations 2400 may further involve generating, at the second device, a second spike based (at least in part) on the rate of the spikes in the spike train. The second spike occurs subsequent to the first spike. For certain aspects, checking the identified stimulus at 2408 entails determining whether an interval between the first spike and the second spike (e.g., the interspike interval) corresponds to the identified stimulus based (at least in part) on the onset of the spike train. For certain aspects, the second device is a detector artificial neuron connected with the first device (e.g., a receptor artificial neuron) via an artificial synapse.

For other aspects, identifying the stimulus at 2406 may include generating, at a second device (e.g., an artificial neuron), a first spike based (at least in part) on the onset of the spike train, as described above. However, the operations 2400 may further involve generating, at a third device (e.g., an artificial neuron, different than the second artificial neuron or other device), a second spike based (at least in part) on the rate of the spikes in the spike train. The second spike occurs subsequent to the first spike. For example, the second and third devices may comprise two LIF neurons. The first and second spikes from the second and third devices, respectively, may be processed by another component, such as an ISI verifier, as described above.

According to certain aspects, the operations 2400 may further include determining the onset of the spike train based on at least one of the foremost spike in the spike train (e.g., the time to the very first spike in the spike train) or a set of initial spikes in the spike train (e.g., the time to a cluster or barrage of initial spikes in the spike train). For certain aspects, the operations 2400 may further include determining the onset of the spike train based on a transient increase in spike probability (e.g., increased coincidence).

According to certain aspects, the operations 2400 may further include determining the onset of the spike train based on a time difference between a reference signal and a particular spike (e.g., the foremost spike) in the spike train. For other aspects, the onset of the spike train may be determined based on a time difference between a reference signal and a time calculation based on multiple spikes in the spike train. The reference signal may come from a clock, a frame boundary, some external synchronization signal, etc.

According to certain aspects, the rate of spikes is averaged over a longer period of time than the onset is determined.

According to certain aspects, the operations 2400 may further include updating a representation of the identified stimulus with a corrected stimulus if the checking fails, wherein the updating may be based on the rate of the spikes. In this case, the operations 2400 may further include outputting a signal (e.g., an additive signal) to generate a behavior associated with the corrected stimulus.

According to certain aspects, the operations 2400 may further include outputting a notification if the checking fails. For example, this notification may be an error indication output by or within the artificial nervous system.

According to certain aspects, the generating at 2404 involves generating the spike train based at least in part on the stimulus and an encoding scheme. For example, if the stimulus is a continuous signal x(t), an encoding scheme h(•) may be used such that the encoded signal, in spikes, is $y(t)=h(x(t))$.

An input strength of the stimulus may be proportional to the rate of spikes. The input strength may also be inversely proportional to the onset of the spike train.

Figure 25:
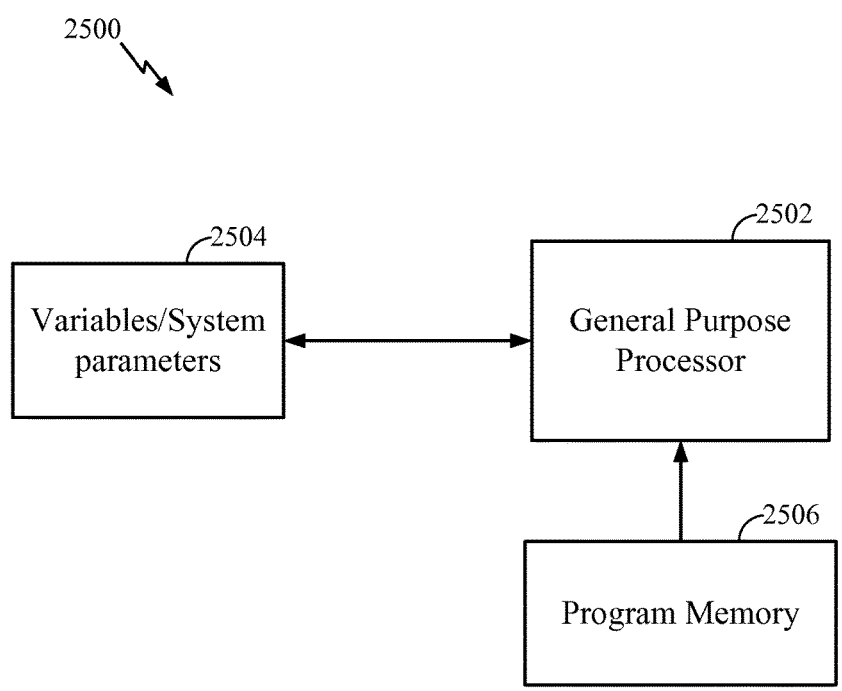
FIG. 25 illustrates an example implementation for operating an artificial nervous system using a general-purpose processor, in accordance with certain aspects of the present disclosure.

FIG. 25 illustrates an example block diagram 2500 of components for implementing the aforementioned method(s) for operating an artificial nervous system using a general-purpose processor 2502, in accordance with certain aspects of the present disclosure. Variables (neural signals), synaptic weights, and/or system parameters associated with a computational network (neural network) may be stored in a memory block 2504, while instructions related executed at the general-purpose processor 2502 may be loaded from a program memory 2506. In an aspect of the present disclosure, the instructions loaded into the general-purpose processor 2502 may include code for receiving a stimulus; code for generating, at a first artificial neuron, a spike train based at least in part on the stimulus; code for identifying the stimulus based at least in part on an onset of the spike train; and code for checking the identified stimulus based at least in part on a rate of spikes in the spike train. In another aspect of the present disclosure, the instructions loaded into the general-purpose processor 2502 may include code for receiving a spike train at an artificial neuron, code for outputting a first spike from the artificial neuron based at least in part on the onset of the spike train, and code for outputting a second spike from the artificial neuron based at least in part on a rate of spikes in the spike train.

Figure 26:
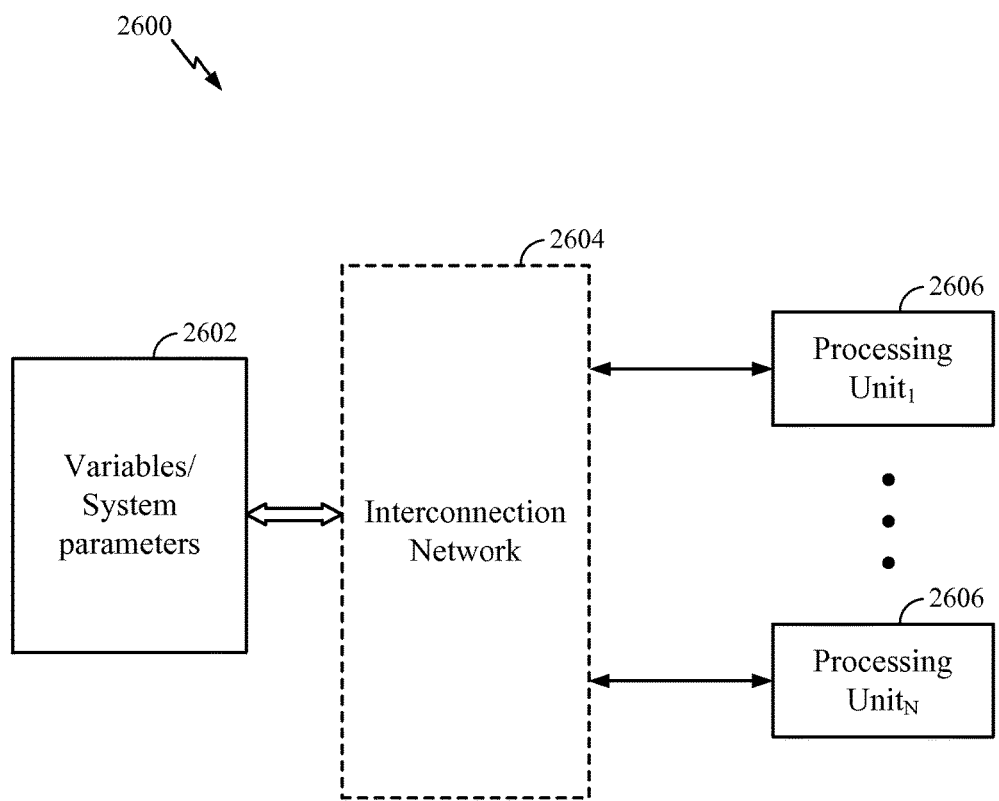
FIG. 26 illustrates an example implementation for operating an artificial nervous system where a memory may be interfaced with individual distributed processing units, in accordance with certain aspects of the present disclosure.

FIG. 26 illustrates an example block diagram 2600 of components for implementing the aforementioned method(s) for operating an artificial nervous system where a memory 2602 can be interfaced via an interconnection network 2604 with individual (distributed) processing units (neural processors) 2606 of a computational network (neural network) in accordance with certain aspects of the present disclosure. Variables (neural signals), synaptic weights, and/or system parameters associated with the computational network (neural network) may be stored in the memory 2602, and may be loaded from the memory 1402 via connection(s) of the interconnection network 2604 into each processing unit (neural processor) 2606. In an aspect of the present disclosure, the processing unit 2606 may be configured to receive a stimulus; to generate, at a first artificial neuron, a spike train based at least in part on the stimulus; to identify the stimulus based at least in part on an onset of the spike train; and to check the identified stimulus based at least in part on a rate of spikes in the spike train. In another aspect of the present disclosure, the processing unit 2606 may be configured to receive a spike train at an artificial neuron, to output a first spike from the artificial neuron based at least in part on the onset of the spike train, and to output a second spike from the artificial neuron based at least in part on a rate of spikes in the spike train.

Figure 27:
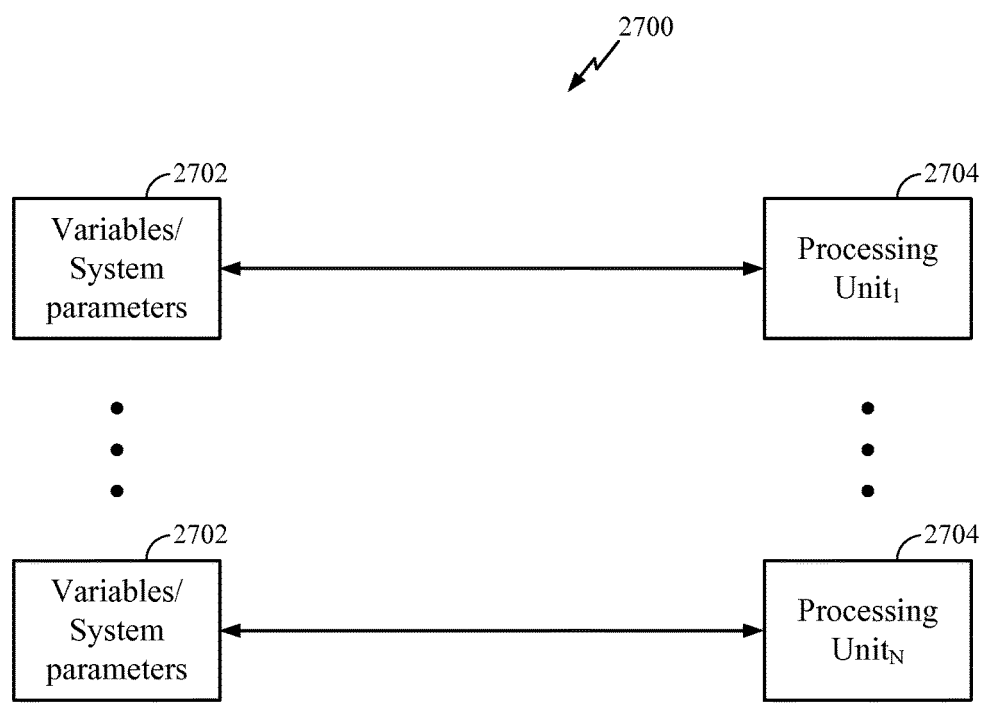
FIG. 27 illustrates an example implementation for operating an artificial nervous system based on distributed memories and distributed processing units, in accordance with certain aspects of the present disclosure.

FIG. 27 illustrates an example block diagram 2700 of components for implementing the aforementioned method for operating an artificial nervous system based on distributed memories 2702 and distributed processing units (neural processors) 2704 in accordance with certain aspects of the present disclosure. As illustrated in FIG. 27, one memory bank 2702 may be directly interfaced with one processing unit 2704 of a computational network (neural network), wherein that memory bank 2702 may store variables (neural signals), synaptic weights, and/or system parameters associated with that processing unit (neural processor) 2704. In an aspect of the present disclosure, the processing unit(s) 2704 may be configured to receive a stimulus; to generate, at a first artificial neuron, a spike train based at least in part on the stimulus; to identify the stimulus based at least in part on an onset of the spike train; and to check the identified stimulus based at least in part on a rate of spikes in the spike train. In another aspect of the present disclosure, the processing unit(s) 2704 may be configured to receive a spike train at an artificial neuron, to output a first spike from the artificial neuron based at least in part on the onset of the spike train, and to output a second spike from the artificial neuron based at least in part on a rate of spikes in the spike train.

Figure 28:
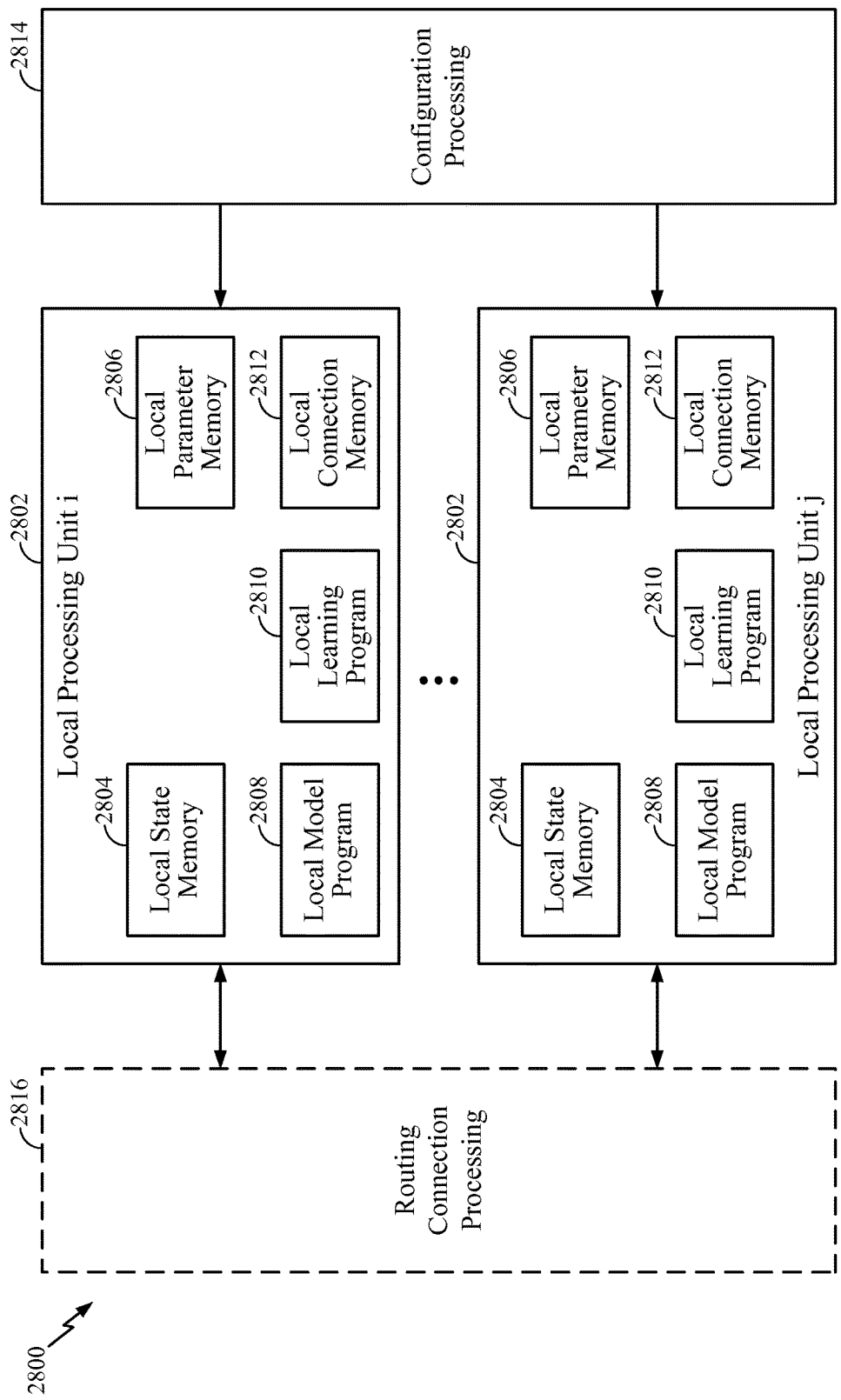
FIG. 28 illustrates an example implementation of a neural network in accordance with certain aspects of the present disclosure.

FIG. 28 illustrates an example implementation of a neural network 2800 in accordance with certain aspects of the present disclosure. As illustrated in FIG. 28, the neural network 2800 may comprise a plurality of local processing units 2802 that may perform various operations of methods described above. Each processing unit 2802 may comprise a local state memory 2804 and a local parameter memory 2806 that store parameters of the neural network. In addition, the processing unit 2802 may comprise a memory 2808 with a local (neuron) model program, a memory 2810 with a local learning program, and a local connection memory 2812. Furthermore, as illustrated in FIG. 28, each local processing unit 2802 may be interfaced with a unit 2814 for configuration processing that may provide configuration for local memories of the local processing unit, and with routing connection processing elements 2816 that provide routing between the local processing units 2802.

According to certain aspects of the present disclosure, each local processing unit 2802 may be configured to determine parameters of the neural network based upon desired one or more functional features of the neural network, and develop the one or more functional features towards the desired functional features as the determined parameters are further adapted, tuned and updated.

Figure 24A:
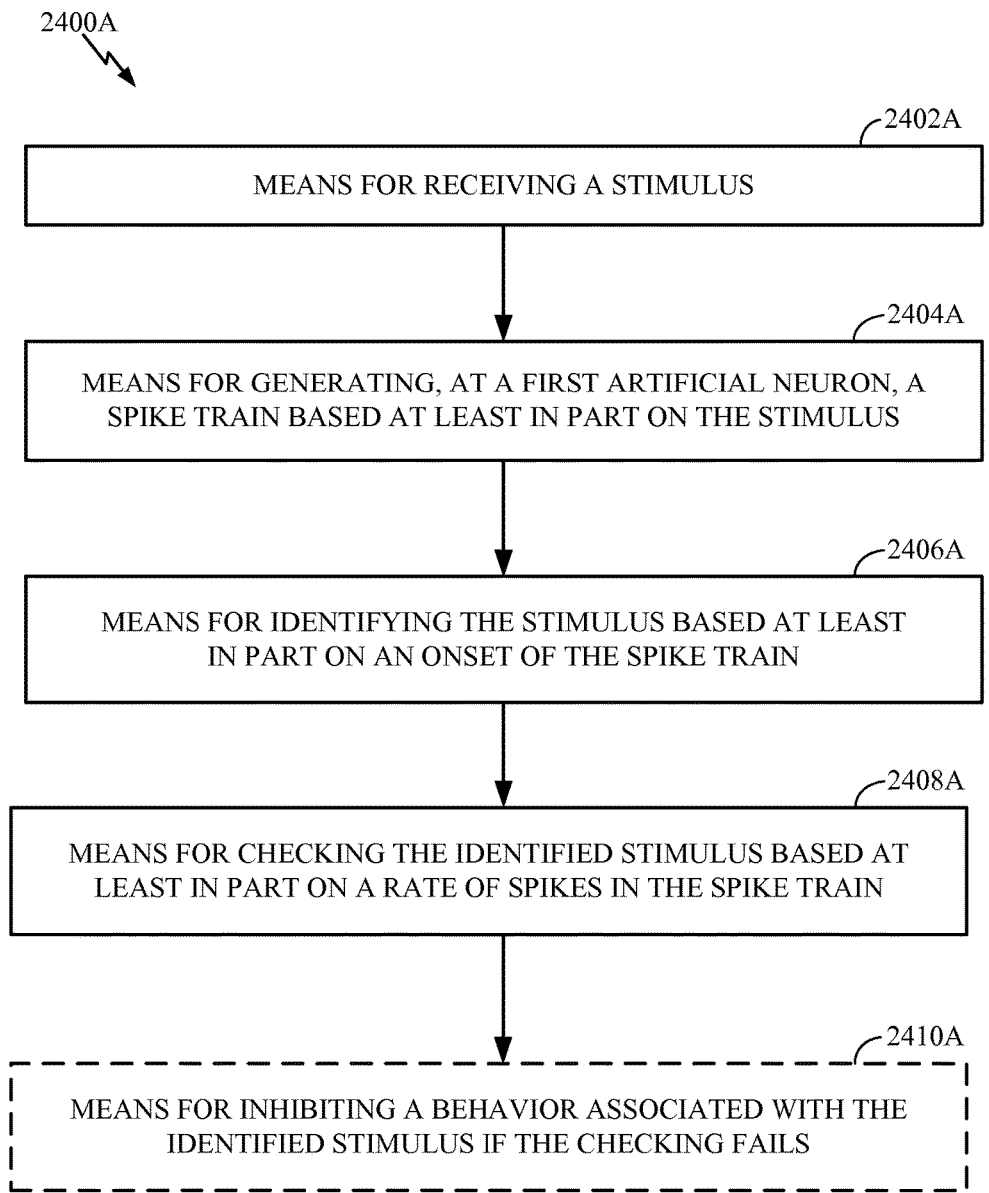
FIG. 24A illustrates example components capable of performing the operations of FIG. 24, in accordance with certain aspects of the present disclosure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, the various operations may be performed by one or more of the various processors shown in FIGS. 25-28. Generally, where there are operations illustrated in figures, those operations may have corresponding counterpart means-plus-function components with similar numbering. For example, operations 2400 illustrated in FIG. 24 correspond to means 2400A illustrated in FIG. 24A.

For example, means for processing, means for receiving, means for retaining, means for outputting, or means for determining may comprise a processing system, which may include one or more processors or processing units. Means for storing may comprise a memory or any other suitable storage device (e.g., RAM), which may be accessed by the processing system.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and BLU-RAY® media disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for operating an artificial nervous system, comprising:
   receiving a stimulus;
   generating, at a first device, a spike train of two or more spikes based at least in part on the stimulus;
   identifying the stimulus based at least in part on an onset of the spike train;
   checking the identified stimulus based at least in part on a rate of the spikes in the spike train;
   taking one or more actions based on the checking, wherein taking one or more actions comprises inhibiting a behavior associated with the identified stimulus or updating a representation of the identified stimulus with a corrected stimulus.

2. The method of claim 1, wherein taking one or more actions comprises inhibiting the behavior associated with the identified stimulus if the checking fails.

3. The method of claim 1, wherein identifying the stimulus comprises generating, at a second device, a first spike based at least in part on the onset of the spike train.

4. The method of claim 3, further comprising:
   generating, at the second device, a second spike based at least in part on the rate of spikes in the spike train, wherein the second spike occurs subsequent to the first spike.

5. The method of claim 4, wherein checking the identified stimulus comprises determining whether an interval between the first spike and the second spike corresponds to the identified stimulus.

6. The method of claim 3, wherein the first device neuron is a receptor artificial neuron and wherein the second device is a detector artificial neuron connected with the receptor artificial neuron via an artificial synapse.

7. The method of claim 1, wherein an input strength of the stimulus is proportional to the rate of spikes and inversely proportional to the onset of the spike train.

8. The method of claim 1, further comprising determining the onset of the spike train based on at least one of the foremost spike in the spike train or a set of initial spikes in the spike train.

9. The method of claim 1, further comprising determining the onset of the spike train based on a time difference between a reference signal and the foremost spike in the spike train.

10. The method of claim 1, further comprising determining the onset of the spike train based on a transient increase in spike probability.

11. The method of claim 1, wherein the rate of spikes is averaged over a longer period of time than the onset is determined.

12. The method of claim 11, further comprising outputting an additive signal to generate a behavior associated with the corrected stimulus.

13. The method of claim 1, wherein taking one or more actions comprises updating the representation of the identified stimulus with a corrected stimulus if the checking fails.

14. The method of claim 1, further comprising outputting a notification if the checking fails.

15. The method of claim 1, wherein the generating comprises generating the spike train based at least in part on the stimulus and an encoding scheme.

16. An apparatus for operating an artificial nervous system, comprising:
    a processing system configured to:
      receive a stimulus;
      generate a spike train of two or more spikes based at least in part on the stimulus;
      identify the stimulus based at least in part on an onset of the spike train;
      check the identified stimulus based at least in part on a rate of the spikes in the spike train;
      take one or more actions based on the check, wherein the one or more actions comprise inhibiting a behavior associated with the identified stimulus or updating a representation of the identified stimulus with a corrected stimulus; and
    a memory coupled to the processing system.

17. An apparatus for operating an artificial nervous system, comprising:
    means for receiving a stimulus;
    means for generating a spike train of two or more spikes based at least in part on the stimulus;
    means for identifying the stimulus based at least in part on an onset of the spike train;
    means for checking the identified stimulus based at least in part on a rate of the spikes in the spike train; and
    means for taking one or more actions based on the checking, wherein means for taking one or more actions comprises means for inhibiting a behavior associated with the identified stimulus or means for updating a representation of the identified stimulus with a corrected stimulus.

18. A non-transitory computer-readable medium for operating an artificial nervous system, having instructions executable to:
    receive a stimulus;
    generate a spike train of two or more spikes based at least in part on the stimulus;
    identify the stimulus based at least in part on an onset of the spike train;
    check the identified stimulus based at least in part on a rate of the spikes in the spike train; and
    take one or more actions based on the check, wherein the one or more actions comprise inhibiting a behavior associated with the identified stimulus or updating a representation of the identified stimulus with a corrected stimulus.

19. A method for identifying a stimulus in an artificial nervous system, comprising:
    receiving a spike train of two or more spikes at an artificial neuron;
    identifying the stimulus based at least in part on an onset of the spike train;
    outputting a first spike from the artificial neuron based at least in part on the onset of the spike train, wherein the first spike corresponds to the identified stimulus;
    outputting a second spike from the artificial neuron based on a rate of the spikes in the spike train;
    checking the identified stimulus based at least in part on an interval between the first spike and the second spike; and
    taking one or more actions based on the checking, wherein taking one or more actions comprises inhibiting a behavior associated with the identified stimulus or updating a representation of the identified stimulus with a corrected stimulus.

20. The method of claim 19, wherein a timing of the second spike is based on an integration of multiple spikes in the spike train.

21. The method of claim 19, wherein an input strength of the stimulus is proportional to the rate of spikes and inversely proportional to the onset of the spike train.

22. An apparatus for identifying a stimulus in an artificial nervous system, comprising:
    a processing system configured to:
        receive a spike train of two or more spikes;
        identify the stimulus based at least in part on an onset of the spike train;
        output a first spike from the artificial neuron based at least in part on the onset of the spike train, wherein the first spike corresponds to the identified stimulus;
        output a second spike from the artificial neuron based on a rate of the spikes in the spike train; and
        check the identified stimulus based at least in part on an interval between the first spike and the second spike; and
        take one or more actions based on the check, wherein the one or more actions comprise inhibiting a behavior associated with the identified stimulus or updating a representation of the identified stimulus with a corrected stimulus; and
    a memory coupled to the processing system.

23. An apparatus for identifying a stimulus in an artificial nervous system, comprising:
    means for receiving a spike train of two or more spikes at an artificial neuron;
    means for identifying the stimulus based at least in part on an onset of the spike train;
    means for outputting a first spike from the artificial neuron based at least in part on the onset of the spike train, wherein the first spike corresponds to the identified stimulus;
    means for outputting a second spike from the artificial neuron based on a rate of the spikes in the spike train;
    means for checking the identified stimulus based at least in part on an interval between the first spike and the second spike; and
    means for taking one or more actions based on the check, wherein means for taking one or more actions comprises means for inhibiting a behavior associated with the identified stimulus or means for updating a representation of the identified stimulus with a corrected stimulus.

24. A non-transitory computer-readable medium for identifying a stimulus in an artificial nervous system, having instructions executable to:
    receive a spike train of two or more spikes at an artificial neuron;
    identify the stimulus based at least in part on an onset of the spike train;
    output a first spike from the artificial neuron based at least in part on the onset of the spike train, wherein the first spike corresponds to the identified stimulus;
    output a second spike from the artificial neuron based on a rate of the spikes in the spike train;
    check the identified stimulus based at least in part on an interval between the first spike and the second spike; and
    take one or more actions based on the check, wherein the one or more actions comprise inhibiting a behavior associated with the identified stimulus or updating a representation of the identified stimulus with a corrected stimulus.

* * * * *